US011909970B2

(12) United States Patent
Moon et al.

(10) Patent No.: US 11,909,970 B2
(45) Date of Patent: *Feb. 20, 2024

(54) IMAGE ENCODING METHOD/DEVICE, IMAGE DECODING METHOD/DEVICE, AND RECORDING MEDIUM IN WHICH BITSTREAM IS STORED

(71) Applicant: Industry Academy Cooperation Foundation of Sejong University, Seoul (KR)

(72) Inventors: Joo Hee Moon, Seoul (KR); Sung Won Lim, Seoul (KR); Dong Jae Won, Goyang-si (KR)

(73) Assignee: Industry Academy Cooperation Foundation of Sejong University, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/468,555

(22) Filed: Sep. 15, 2023

(65) Prior Publication Data
US 2024/0007626 A1 Jan. 4, 2024

Related U.S. Application Data

(63) Continuation of application No. 17/818,650, filed on Aug. 9, 2022, which is a continuation of application
(Continued)

(30) Foreign Application Priority Data

Oct. 14, 2016 (KR) .................. 10-2016-0133754
Oct. 14, 2016 (KR) .................. 10-2016-0133757
(Continued)

(51) Int. Cl.
H04N 19/119 (2014.01)
H04N 19/105 (2014.01)
(Continued)

(52) U.S. Cl.
CPC ......... *H04N 19/119* (2014.11); *H04N 19/105* (2014.11); *H04N 19/176* (2014.11); *H04N 19/192* (2014.11); *H04N 19/96* (2014.11)

(58) Field of Classification Search
CPC .................................................. H04N 19/119
(Continued)

(56) References Cited

U.S. PATENT DOCUMENTS 8,687,654 B1 * 4/2014 Lundin ............ H04N 21/23605
370/473
2013/0034159 A1 2/2013 Siekmann et al.
(Continued)

FOREIGN PATENT DOCUMENTS

CN 105847814 A 8/2016
KR 10-2011-0047697 A 5/2011
(Continued)

OTHER PUBLICATIONS

Huang, Han, et al. "EE2. 1: Quadtree plus binary tree structure integration with JEM tools." *Joint Video Exploration Team (JVET) of ITU-T SG* 16 WP 3 and ISO/IEC JTC 1/SC 29/WG 11. 3$^{rd}$ Meeting May 26-Jun. 1, 2016. pp. 1-5.
(Continued)

*Primary Examiner* — Yulin Sun
(74) *Attorney, Agent, or Firm* — BROADVIEW IP LAW, PC

(57) ABSTRACT

The present invention provides an image encoding method and an image decoding method. The image encoding method of the present invention comprises: a first dividing step of dividing a current image into a plurality of blocks; and a second dividing step of dividing, into a plurality of sub blocks, a block, which is to be divided and includes a boundary of the current image, among the plurality of blocks, wherein the second dividing step is recursively
(Continued)

performed by setting a sub block including the boundary of the current images as the block to be divided, until the sub block including the boundary of the current image does not exist among the sub blocks.

4 Claims, 32 Drawing Sheets

Related U.S. Application Data

No. 17/328,273, filed on May 24, 2021, now Pat. No. 11,659,178, which is a continuation of application No. 16/341,792, filed as application No. PCT/KR2017/011213 on Oct. 12, 2017, now Pat. No. 11,057,624.

(30) Foreign Application Priority Data

Sep. 29, 2017 (KR) .......................... 10-2017-0127939
Sep. 29, 2017 (KR) .......................... 10-2017-0127942

(51) Int. Cl.
 *H04N 19/176* (2014.01)
 *H04N 19/192* (2014.01)
 *H04N 19/96* (2014.01)

(58) Field of Classification Search
 USPC .................................................... 375/240.02
 See application file for complete search history.

(56) References Cited

U.S. PATENT DOCUMENTS

| | | | |
|---|---|---|---|
| 2015/0358640 A1* | 12/2015 | Hendry | ................. H04N 19/61 |
| | | | 375/240.13 |
| 2016/0165241 A1 | 6/2016 | Park et al. | |
| 2017/0142442 A1 | 5/2017 | Tsukuba et al. | |
| 2018/0077423 A1* | 3/2018 | Xu | ....................... H04N 19/523 |

FOREIGN PATENT DOCUMENTS

| | | |
|---|---|---|
| KR | 10-2013-0006690 A | 1/2013 |
| KR | 10-2014-0124434 A | 10/2014 |
| KR | 10-2014-0139459 A | 12/2014 |
| KR | 10-2015-0056811 A | 5/2015 |
| KR | 10-2015-0123177 A | 11/2015 |
| KR | 10-2015-0141164 A | 12/2015 |
| KR | 10-2015-0024910 A | 3/2016 |
| KR | 10-2016-0099727 A | 8/2016 |
| WO | WO 2011/013580 A1 | 2/2011 |
| WO | WO 2011/128365 A1 | 10/2011 |
| WO | WO 2014/078068 A1 | 5/2014 |
| WO | 2015/199040 A1 | 12/2015 |

OTHER PUBLICATIONS

International Search Report dated Jan. 23, 2018 in corresponding International Application No. PCT/KR2017/011213 (9 pages in English, 9 pages in Korean).

* cited by examiner

FIG. 18

| order | 0 | 1 | 2 | 3 | 4 | 5 | 6 | 7 | 8 | 9 | 10 | 11 |
|---|---|---|---|---|---|---|---|---|---|---|---|---|
| candidate index(past) | 0 | 1 | 0 | 2 | 1 | 2 | 0 | 3 | 1 | 3 | 2 | 3 |
| candidate index (future) | 1 | 0 | 2 | 0 | 2 | 1 | 3 | 0 | 3 | 1 | 3 | 2 |

FIG. 19

| condition | | | MPM candidate1 | MPM candidate2 | MPM candidate3 |
|---|---|---|---|---|---|
| L = A | L = angle prediction mode | | L | L-1 | L+1 |
| | other | | Planar | DC | vertical (angle prediction mode) |
| L ≠ A | L ≠ Planar mode && A ≠ Planar mode | | L | A | Planar |
| | other | L ≠ DC mode && A ≠ DC mode | L | A | DC |
| | | other | L | A | vertical (angle prediction mode) |

FIG. 23
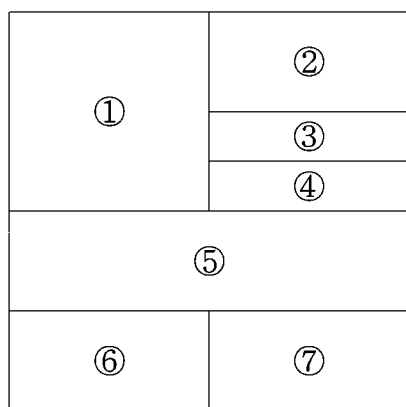
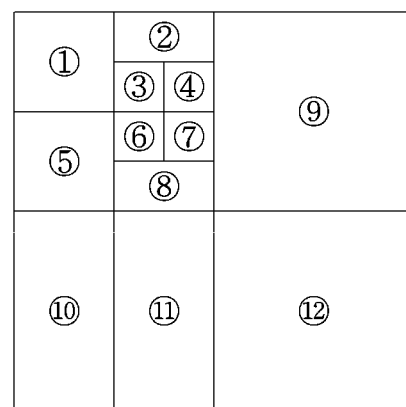
(a)　　　　　　　　　　(b)

FIG. 29

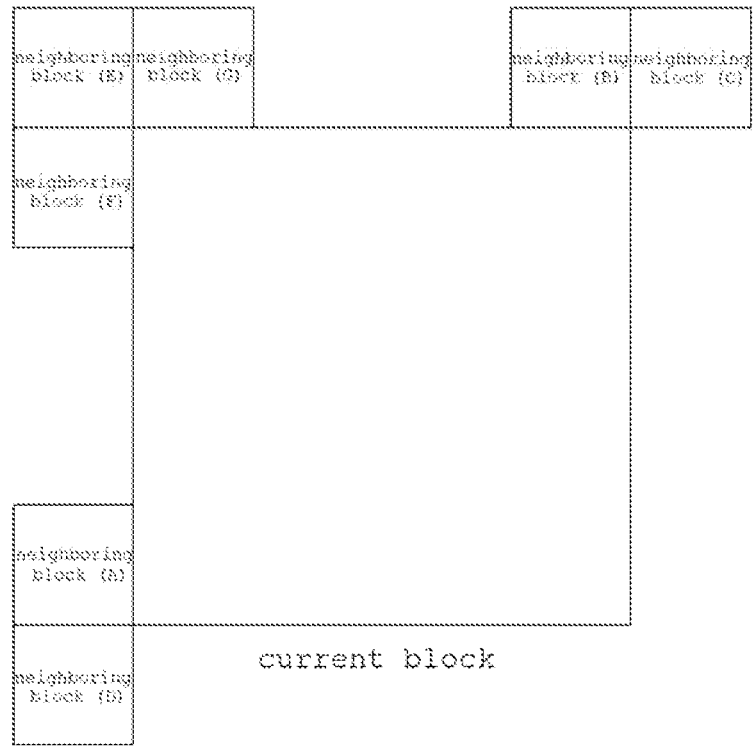

(a)

| block | prediction information |
|---|---|
| A | intra prediction vertical mode, MPM application X |
| B | intra prediction AMVP mode, AMVP optimal candidate: G block MV |
| C | inter prediction Merge mode, reference information: E block motion information |
| D | intra prediction vertical mode, MPM application O (A block reference) |
| E | inter prediction AMVP mode, AMVP optimal candidate: unknown |
| F | intra prediction horizontal mode, MPM application X |
| G | inter prediction Merge mode, reference information: E block motion information |

(b)

IMAGE ENCODING METHOD/DEVICE, IMAGE DECODING METHOD/DEVICE, AND RECORDING MEDIUM IN WHICH BITSTREAM IS STORED

CROSS REFERENCE TO RELATED APPLICATIONS

This application is a Continuation Application of a currently U.S. patent application Ser. No. 17/818,650, filed on Aug. 9, 2022, which is a Continuation of application Ser. No. 17/328,273, filed on May 24, 2021, now Granted U.S. Pat. No. 11,659,178, issued May 23, 2023, which is a Continuation of application Ser. No. 16/341,792, filed on Apr. 12, 2019, now Granted U.S. Pat. No. 11,057,624, issued Jul. 6, 2021, which is a U.S. National Stage Application of International Application No. PCT/KR2017/011213, filed on Oct. 12, 2017, which claims the benefit under 35 USC 119(a) and 365(b) of Korean Patent Application No. 10-2016-0133754, filed on Oct. 14, 2016, Korean Patent Application No. 10-2016-0133757, filed on Oct. 14, 2016, Korean Patent Application No. 10-2017-0127939, filed on Sep. 29, 2017, and Korean Patent Application No. 10-2017-0127942, filed on Sep. 29, 2017, in the Korean Intellectual Property Office, the entire disclosures of which are incorporated herein by reference for all purposes.

TECHNICAL FIELD

The present invention relates to an image encoding/decoding method and apparatus and particularly to a method and apparatus for processing image boundaries in image encoding/decoding. More particularly, the present invention relates to a method and apparatus for effectively processing image boundaries in an image padding and tree structure.

BACKGROUND ART

In recent years, demand for multimedia data such as video has been rapidly increasing on the Internet. However, it is hard for development of technology for improving channel bandwidths to keep up with the rapid changes in the demand for multimedia data. In order to solve this problem, Moving Picture Expert Group (MPEG) of ISO/IEC and Video Coding Expert Group (VCEG) of ITU-T, which is the International Organization for Standardization, are continuously collaborating to establish improved compression standards.

Video compression consists largely of intra prediction, inter-picture prediction, transform, quantization, entropy coding, and an in-loop filter. Among them, the intra prediction is a technique of generating a prediction block for a current block by using reconstructed pixels existing around the current block. In this case, since the encoding process is performed on a per block basis so that the size of the image has to be a multiple of the size of the block, there is a problem that it is difficult to perform encoding on a per block basis.

DISCLOSURE

Technical Problem

An object of the present invention is to provide an image encoding/decoding method and an image encoding/decoding apparatus capable of improving compression efficiency in image encoding/decoding.

It is another object of the present invention to provide a padding method and apparatus for adjusting the size of an image on a per block basis in image encoding/decoding.

It is another object of the present invention to provide an image partitioning method and apparatus which is efficient for image boundary processing in image coding decoding.

It is another object of the present invention to provide an image encoding/decoding method and an image encoding/decoding apparatus capable of improving compression efficiency by efficiently using information of neighboring blocks when encoding/decoding a current block in image encoding/decoding.

It is another object of the present invention to provide a computer-readable recording medium storing a bitstream generated by a video encoding method/apparatus according to the present invention.

Technical Solution

An image encoding method according to the present invention includes a first partition step of partitioning a current image into a plurality of blocks; and a second partition step of partitioning a partition target block including a boundary of the current image among the plurality of blocks, into a plurality of sub-blocks, wherein, until a sub-block including the boundary of the current image does not exist among the sub-blocks, the second partition step is recursively performed by setting the sub-block including the boundary of the current images as the partition target block.

In the image encoding method according to the present invention, the first partition step may partition the current image into a plurality of largest blocks having the same size.

In the image encoding method according to the present invention, the second partition step may perform quad tree partitioning or binary tree partitioning on the partition target block.

In the image encoding method according to the present invention, when the partition target block has a size in which the quad tree partitioning is possible, the second partition step may perform the quad tree partitioning on the partition target block, and when the partition target block has a size in which the quad tree partitioning is not possible, the second partition step may perform the binary tree partitioning on the partition target block.

In the image encoding method according to the present invention, when the quad tree partitioning or the binary tree partitioning is performed on the partition target block in the second partition step, first partition information indicating whether the partition target block is quad tree partitioned or second partition information indicating whether the partition target block is binary tree partitioned may be not encoded In the image encoding method according to the present invention, when the binary tree partitioning is performed on the partition target block in the second partition step, a partition direction of the binary tree partitioning may be determined on the basis of a type of an encoding target block that is included in the partition target block and is an area in a boundary of the current image.

In the image encoding method according to the present invention, when the binary tree partitioning is performed on the partition target block in the second partition step, partition direction information indicating a partition direction of the binary tree partition may be not encoded.

In the image encoding method according to the present invention, the second partition step may further include comparing a size of a remaining area that is included in the partition target block and is an area outside the boundary of the current image with a predetermined threshold value, and one of the quad tree partitioning and the binary tree partitioning may be performed on the partition target block on the basis of the comparison result.

In the image encoding method according to the present invention, the size of the remaining area may be a smaller one of a horizontal length and a vertical length of the remaining area, and the second partition step may perform the quad tree partitioning on the partition target block when the size of the remaining area is greater than the predetermined threshold value, and perform the binary tree partitioning on the partition target block when the size of the remaining area is smaller than the predetermined threshold value.

In the image encoding method according to the present invention, the second partition step may perform binary tree partitioning on the partition target block, and a partition direction of the binary tree partitioning may be determined on the basis of a type of a remaining area that is included in the partition target block and is an area outside the boundary of the current image.

In the image encoding method according to the present invention, the partition direction of the binary tree partitioning may be vertical when the type of the remaining area is a vertically long block, and may be horizontal when the type of the remaining area is a horizontally long block.

An image decoding method according to the present invention includes a first partition step of partitioning a current image into a plurality of blocks; and a second partition step of partitioning a partition target block including a boundary of the current image among the plurality of blocks, into a plurality of sub-blocks, wherein, until a sub-block including the boundary of the current image does not exist among the sub-blocks, the second partition step is recursively performed by setting the sub-block including the boundary of the current images as the partition target block.

In the image decoding method according to the present invention, the second partition step may perform quad tree partitioning or binary tree partitioning on the partition target block.

In the image decoding method according to the present invention, when the partition target block has a size in which the quad tree partitioning is possible, the second partition step may perform the quad tree partitioning on the partition target block, and when the partition target block has a size in which the quad tree partitioning is not possible, the second partition step may perform the binary tree partitioning on the partition target block.

In the image decoding method according to the present invention, when the quad tree partitioning or the binary tree partitioning is performed on the partition target block in the second partition step, first partition information indicating whether the partition target block is quad tree partitioned or second partition information indicating whether the partition target block is binary tree partitioned may not be decoded from a bitstream but derived into a predetermined value.

In the image decoding method according to the present invention, when the binary tree partitioning is performed on the partition target block in the second partition step, a partition direction of the binary tree partitioning may be determined on the basis of a type of an decoding target block that is included in the partition target block and is an area in a boundary of the current image.

In the image decoding method according to the present invention, when the binary tree partitioning is performed on the partition target block in the second partition step, partition direction information indicating a partition direction of the binary tree partition may not be decoded from a bitstream but derived into a predetermined value.

In the image decoding method according to the present invention, the second partition step may further include comparing a size of a remaining area that is included in the partition target block and is an area outside the boundary of the current image with a predetermined threshold value, and one of the quad tree partitioning and the binary tree partitioning may be performed on the partition target block on the basis of the comparison result.

In the image decoding method according to the present invention, the size of the remaining area may be a smaller one of a horizontal length and a vertical length of the remaining area, and the second partition step may perform the quad tree partitioning on the partition target block when the size of the remaining area is greater than the predetermined threshold value, and perform the binary tree partitioning on the partition target block when the size of the remaining area is smaller than the predetermined threshold value.

In the image decoding method according to the present invention, the second partition step may perform binary tree partitioning on the partition target block, and a partition direction of the binary tree partitioning may be determined on the basis of a type of a remaining area that is included in the partition target block and is an area outside the boundary of the current image.

In the image decoding method according to the present invention, the partition direction of the binary tree partitioning may be vertical when the type of the remaining area is a vertically long block, and may be horizontal when the type of the remaining area is a horizontally long block.

An image decoding method according to the present invention includes determining a partition type of an upper level block including a current block; constructing a reference candidate list of the current block on the basis of the partition type of the upper level block; deriving prediction information for the current block on the basis of the reference candidate list; and generating a prediction block of the current block on the basis of the prediction information, wherein the reference candidate list includes prediction information of at least one candidate block or the at least one candidate block, and the at least one candidate block is included in the reference candidate list according to a predetermined priority.

The image decoding method according to the present invention, the method may further include comparing the partition depth of the immediately preceding block of the current block and the partition depth of the current block in the decoding order when the partition type of the upper block is a binary tree partition; and determining whether or not the upper block of the previous block and the upper block of the current block are the same, wherein when the partition depth of the immediately preceding block and the partition depth of the current block are the same, and the upper block of the block is the same, the immediately preceding block may be excluded from the at least one candidate block.

In the image decoding method according to the present invention, when the immediately preceding block is excluded from the at least one candidate block, the method may further include including a substitute block in the reference candidate list.

In the image decoding method according to the present invention, the substitute block may be a block that is not adjacent to the current block among blocks partitioned from the upper level block of the current block.

In the image decoding method according to the present invention, when the current block is intra predicted, the reference candidate list is an MPM list, and when the current block is inter predicted, the reference candidate list may be a candidate list including a spatial candidate list.

In the image decoding method according to the present invention, the method may further include determining whether the current block is the last sub-block in the decoding order among the four sub-blocks generated by quad tree partitioning when the partition type of the upper level block is quad tree partitioning, and determining whether the remaining three sub-blocks except the current block among the four sub-blocks have the same prediction information when the current block is the last sub-block, wherein when the three sub-blocks have the same prediction information, the remaining three sub-blocks may be excluded from the at least one candidate block.

In the image decoding method according to the present invention, the at least one candidate block may be included in the reference candidate list according to a predetermined priority.

In the image decoding method according to the present invention, the priority may be determined on the basis of at least one of whether the current block is adjacent to the candidate block and the position of the candidate block.

In the image decoding method according to the present invention, a candidate block adjacent to the current block may have a higher priority than a candidate block not adjacent to the current block In the image decoding method according to the present invention, a candidate block located at the left or top of the current block may have a higher priority than other candidate blocks.

In the image decoding method according to the present invention, the priority may be determined on the basis of at least one of a partition depth of the current block and a partition depth of the candidate block.

In the image decoding method according to the present invention, the smaller the difference between the partition depth of the current block and the partition depth of the candidate block, the higher the priority.

In the image decoding method according to the present invention, a candidate block having a large partition depth may have a higher priority than a candidate block having a small partition depth.

In the image decoding method according to the present invention, the priority may be determined on the basis of a partition order of the candidate blocks.

In the image decoding method according to the present invention, a candidate block having a fast partition order may have a higher priority than a candidate block having a slow partition order.

In the image decoding method according to the present invention, the priority order may be determined on the basis of the relationship of prediction information between the candidate blocks.

In the image decoding method according to the present invention, when the prediction information of the first candidate block among the candidate blocks is determined on the basis of the prediction information of the second candidate block among the candidate blocks, the first candidate block may have a lower priority than the candidate block.

An image encoding method according to the present invention includes deriving prediction information for a current block, generating prediction block of the current block on the basis of the prediction information, determining a partition type of an upper level block including the current block, constructing a reference candidate list of the current block on the basis of the partition type of the upper block, and encoding the prediction information for the current block on the basis of the reference candidate list, wherein the reference candidate list may include at least one candidate block or prediction information of the at least one candidate block.

In the image encoding method according to the present invention, the method may further include comparing the partition depth of the immediately preceding block of the current block and the partition depth of the current block in the coding order when the partition type of the upper block is the binary tree partition, and determining whether or not the upper block of the previous block and the upper block of the current block are the same, wherein the dividing depth of the immediately preceding block and the dividing depth of the current block are the same, Wherein the immediately preceding block is excluded from the at least one candidate block when the upper level block of the block is the same.

In the image encoding method according to the present invention, when the partition type of the upper level block is quad tree partitioning, the current block is the last sub-block in the coding order out of the four sub-blocks generated by quad tree partitioning and determining whether the remaining three sub-blocks except the current block among the four sub-blocks have the same prediction information when the current block is the last sub-block, when the three sub-blocks have the same prediction information, the remaining three sub-blocks may be excluded from the at least one candidate block.

In the image encoding method according to the present invention, the at least one candidate block may be included in the reference candidate list according to a predetermined priority.

In the image encoding method according to the present invention, the priority may be determined on the basis of at least one of whether the current block is adjacent to the candidate block and the position of the candidate block.

In the image coding method according to the present invention, the priority may be determined on the basis of at least one of a partition depth of the current block and a partition depth of the candidate block.

In the image encoding method according to the present invention, the priority order may be determined on the basis of the partition order of the candidate blocks.

In the image encoding method according to the present invention, the priority may be determined on the basis of the relationship of prediction information between the candidate blocks.

The computer readable recording medium according to the present invention may store a bit stream generated by the image encoding method according to the present invention.

Advantageous Effects

According to the present invention, it is possible to provide an image encoding/decoding method and an image encoding/decoding apparatus capable of improving compression efficiency in image encoding/decoding.

In addition, according to the present invention, it is possible to provide a padding method and apparatus for adjusting the size of an image on a per block basis in image encoding/decoding.

In addition, according to the present invention, it is possible to provide an image partitioning method and apparatus which is efficient for image boundary processing in image coding decoding.

In addition, according to the present invention, it is possible to provide an image encoding/decoding method and an image encoding/decoding apparatus capable of improving compression efficiency by efficiently using information of neighboring blocks when encoding/decoding a current block in image encoding/decoding.

In addition, according to the present invention, it is possible to provide a computer-readable recording medium storing a bitstream generated by a video encoding method/apparatus according to the present invention.

The compression efficiency of the image may be improved using the padding method and apparatus or the block partitioning method and apparatus according to the present invention.

DESCRIPTION OF DRAWINGS

FIG. 18 is an exemplary table illustrating a priority of a combination capable of being used to generate bidirectional motion information candidates.

FIG. 19 is a view illustrating generation of an MPM candidate list.

FIG. 23 is a view illustrating an example of constructing a reference candidate list of a current block on the basis of a partition type of a block.

FIG. 29 is a view illustrating a method of determining the priority of neighboring blocks on the basis of casual relationship of prediction information.

MODE FOR INVENTION

Figure 1:
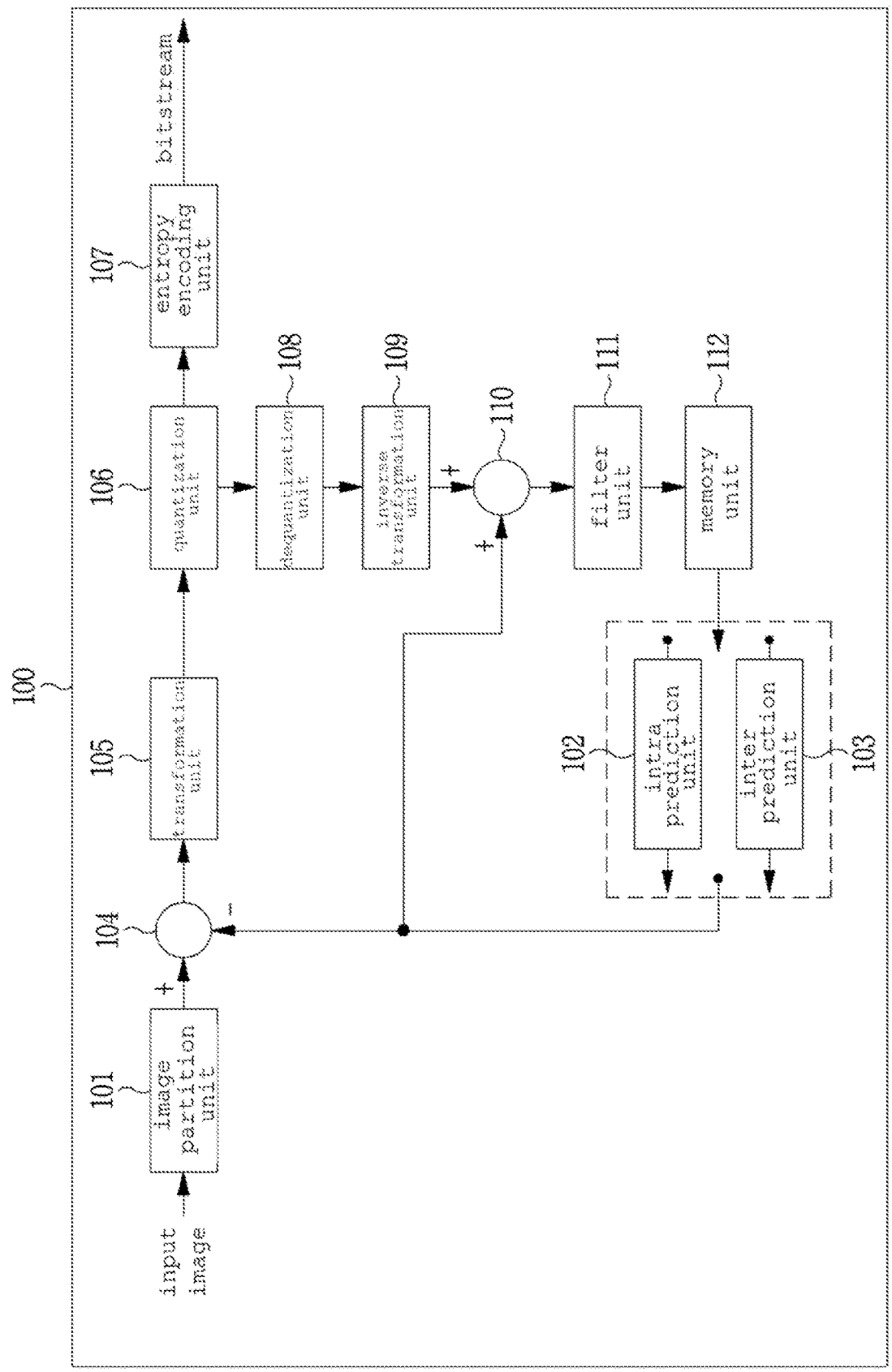
FIG. 1 is a block diagram schematically illustrating an image encoding apparatus according to an embodiment of the present invention.

While the invention is susceptible to various modifications and alternative forms, specific embodiments thereof are shown by way of example in the drawings and will herein be described in detail. It should be understood, however, that the invention is not intended to be limited to the particular embodiments, but includes all modifications, equivalents, and alternatives falling within the spirit and scope of the invention. Like reference numerals are used for like elements in describing each drawing.

Terms such as first, second, A, B, and the like may be used to describe various components, but the components should not be limited by these terms. The terms are used only for the purpose of distinguishing one component from another. For example, without departing from the scope of the present invention, the first component may be referred to as a second component, and similarly, the second component may also be referred to as a first component. The term "and/or" includes any combination of a plurality of related listed items or any of a plurality of related listed items.

It is to be understood that when an element is referred to as being "connected" or "coupled" to another element, it may be directly connected or coupled to the other component, but it should be understood that other components may be present between them. On the other hand, when an element is referred to as being "directly connected" or "directly coupled" to another element, it should be understood that there are no other elements between them.

The terminology used herein is for the purpose of describing particular embodiments only and is not intended to be limiting of the invention. The singular forms include plural referents unless the context clearly dictates otherwise. In this application, the terms "comprising" or "having", etc., are used to specify that there is a stated feature, figure, step, operation, element, part or combination thereof, but do not preclude the presence or addition of one or more other features, integers, steps, operations, components, parts, or combinations thereof.

Hereinafter, embodiments of the present invention will be described in detail with reference to the accompanying drawings. Hereinafter, the same reference numerals will be used for the same constituent elements in the drawings, and redundant explanations for the same constituent elements will be omitted.

FIG. 1 is a block diagram schematically illustrating an image encoding apparatus according to an embodiment of the present invention.

Referring to FIG. 1, an image encoding apparatus 100 includes an image partition unit 101, an intra prediction unit 102, an inter prediction unit 103, a subtractor 104, a transformation unit 105, a quantization unit 106, an entropy encoding unit 107, an dequantization unit 108, an inverse transformation unit 109, an adder 110, a filter unit 111, and a memory 112.

The respective components shown in FIG. 1 are shown independently to represent different characteristic functions in the image encoding apparatus, and do not mean that each of the components is composed of a separate hardware or a single software constituent unit. That is, each component is listed and included for convenience of explanation, and at least two components of components units may be combined to form one component, or one component may be divided into a plurality of components to perform a function. The integrated embodiments and separate embodiments of the components are also included within the scope of the present invention, without departing from the essence of the present invention.

Furthermore, some components are not essential components that perform essential functions in the present invention, but may be optional components only for improving performance. The present invention may be implemented including only components essential for realizing the essence of the present invention except for the components used for performance improvement, and only components essential for realizing the essence of the present invention except for the components used for performance improvement are also included in the scope of the present invention.

The image partition unit 101 may partition an input image into at least one block. Here, the input image may have various shapes and sizes such as a picture, a slice, a tile, a segment, and the like. A block may mean a coding unit (CU), a prediction unit (PU), or a transform unit (TU). The partitioning may be performed on the basis of at least one of a quad tree or a binary tree. The quad tree is a method of quad-partitioning an upper level block into sub-blocks whose width and height are half of the upper level block. A binary tree is a method of bi-partitioning an upper block into sub-blocks in which any one of width or height is half of the upper level block. Through the binary tree-based partitioning described above, a block may have a non-square shape as well as a square shape.

Hereinafter, in the embodiment of the present invention, a coding unit may mean a unit for performing encoding and may mean a unit for performing decoding.

The prediction units 102 and 103 may include an intra prediction unit 103 for performing inter prediction and an intra prediction unit 102 for performing intra prediction. It is possible to determine whether to use inter prediction or intra prediction for a prediction unit and to determine specific information (for example, intra prediction mode, motion vector, reference picture, etc.) according to each prediction method. Here, the processing unit in which the prediction is performed may be different from the processing unit in which the prediction method and the concrete contents are determined. For example, the prediction method, the prediction mode, and the like are determined by a prediction unit, and the prediction may be performed by a transform unit.

The residual value (residual block) between the generated prediction block and the original block may be input to the transformation unit 105. In addition, prediction mode information, motion vector information, and the like used for prediction may be encoded in the entropy encoding unit 107 together with the residual value, and then transmitted to the decoder. When a specific encoding mode is used, the original block may be encoded as it is without generating the prediction block through the prediction units 102 and 103 and transmitted to the decoding unit.

The intra prediction unit 102 may generate a prediction block on the basis of reference pixel information around the current block, which is pixel information in a current picture. When the prediction mode of the neighboring block of the current block on which intra prediction is to be performed is inter prediction, a reference pixel included in a neighboring block to which inter prediction is applied may be substituted with a reference pixel in another neighboring block to which intra prediction is applied. In other words, when the reference pixel is not available, it is possible to substitute the unavailable reference pixel information with at least one of the available reference pixels.

In intra prediction, the prediction mode may have a directional prediction mode in which reference pixel information is used according to a prediction direction, and a non-directional mode in which prediction information is not used upon performing prediction. The mode for predicting the luminance information may be different from the mode for predicting the chrominance information, and the intra prediction mode information used for predicting the luminance information or predicted luminance signal information may be utilized in order to predict the chrominance information.

The intra prediction unit 102 may include an adaptive intra smoothing (AIS) filter, a reference pixel interpolator, and a DC filter. The AIS filter is a filter that performs filtering on the reference pixels of the current block, and may adaptively determine whether to apply the filter according to the prediction mode of the current prediction unit. When the prediction mode of the current block is a mode that does not perform AIS filtering, the AIS filter may not be applied.

The reference pixel interpolator of the intra prediction unit 102 may interpolate the reference pixel to generate a reference pixel in the position of a fractional unit, when an intra prediction mode of a prediction unit is a prediction unit performing intra prediction on the basis of a pixel value obtained by interpolating a reference pixel. The reference pixel may not be interpolated, when the prediction mode of the current prediction unit generates a prediction block without interpolating the reference pixel. The DC filter may generate the prediction block through filtering when the prediction mode of the current block is DC mode.

A residual block including residual information, which is a difference value between the prediction unit generated in the prediction units 102 and 103 and the original block of the prediction unit, may be generated. The generated residual block may be input to the transformation unit 130 and then transformed.

Figure 2:
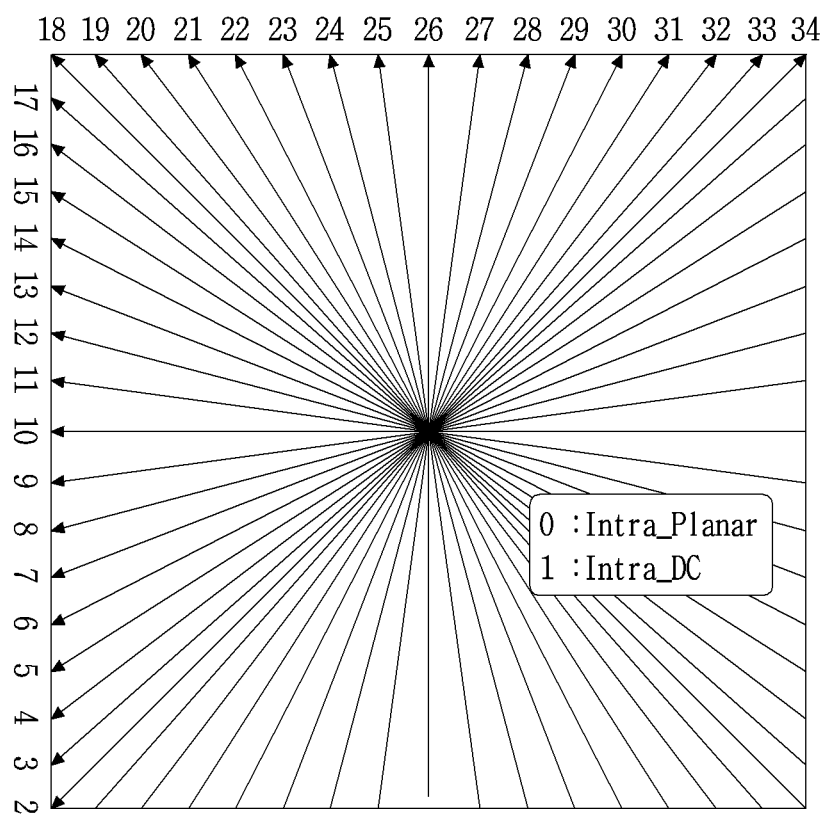
FIG. 2 is a view showing types of intra prediction modes defined in the image encoding/decoding apparatus.

FIG. 2 is a view showing an example of intra prediction mode. The intra prediction mode shown in FIG. 2 has a total of 35 modes. A mode 0 represents a planar mode, a mode 1 represents a DC mode, and modes 2 to 34 represent angular modes.

Figure 3:
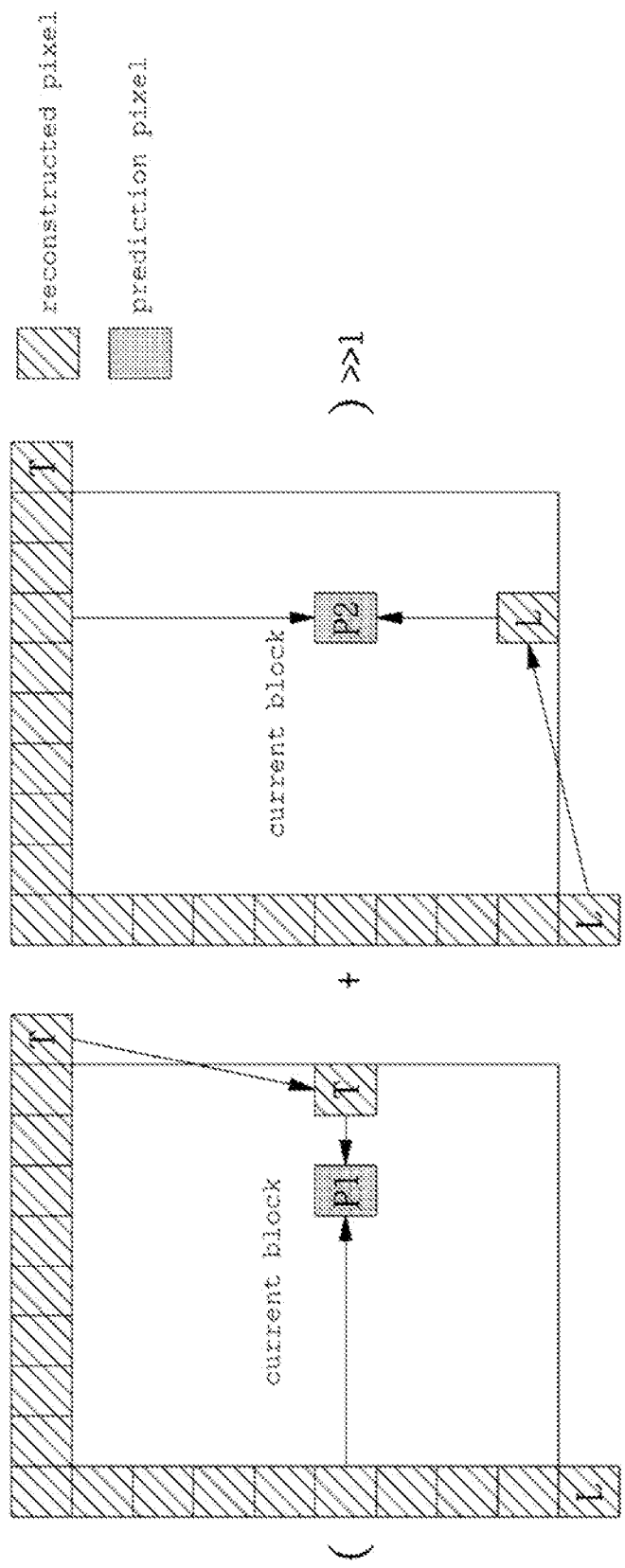
FIG. 3 is a view illustrating an intra prediction method based on a planar mode.

FIG. 3 is a view illustrating an intra prediction method based on a planar mode.

FIG. 3 is a view illustrating a planar mode. A prediction value of the first pixel P1 in the current block is generated by linearly interpolating the reconstructed pixel located at the same position in the Y axis and the reconstructed pixel T located at the upper right of the current block as shown. Likewise, a prediction value of the second pixel P2a is generated by linearly interpolating the reconstructed pixel located at the same position in the X axis and a reconstructed pixel L located at the lower left of the current block as shown. A value obtained by averaging two prediction pixels P1 and P2 becomes a final prediction pixel. In the planar mode, prediction pixels are derived in the same manner as described above to generate the prediction block of the current block.

Figure 4:
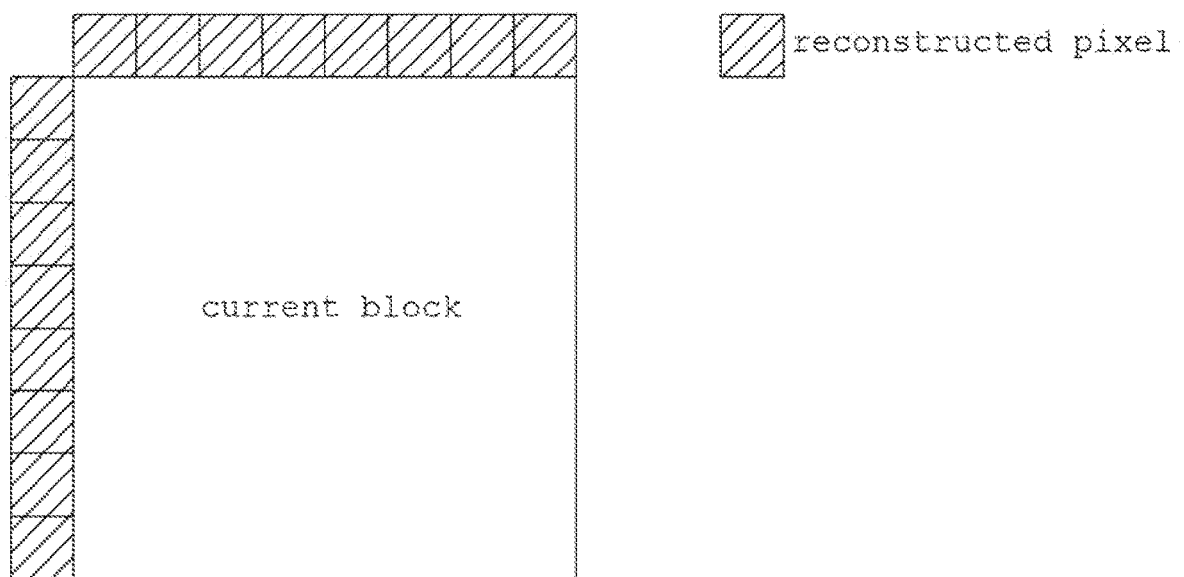
FIG. 4 is a view illustrating reference pixels for intra prediction.

FIG. 4 is a view illustrating a DC mode. The average of the reconstructed pixels around the current block is calculated, and then the average value is used as the prediction value of all the pixels in the current block.

Figure 5:
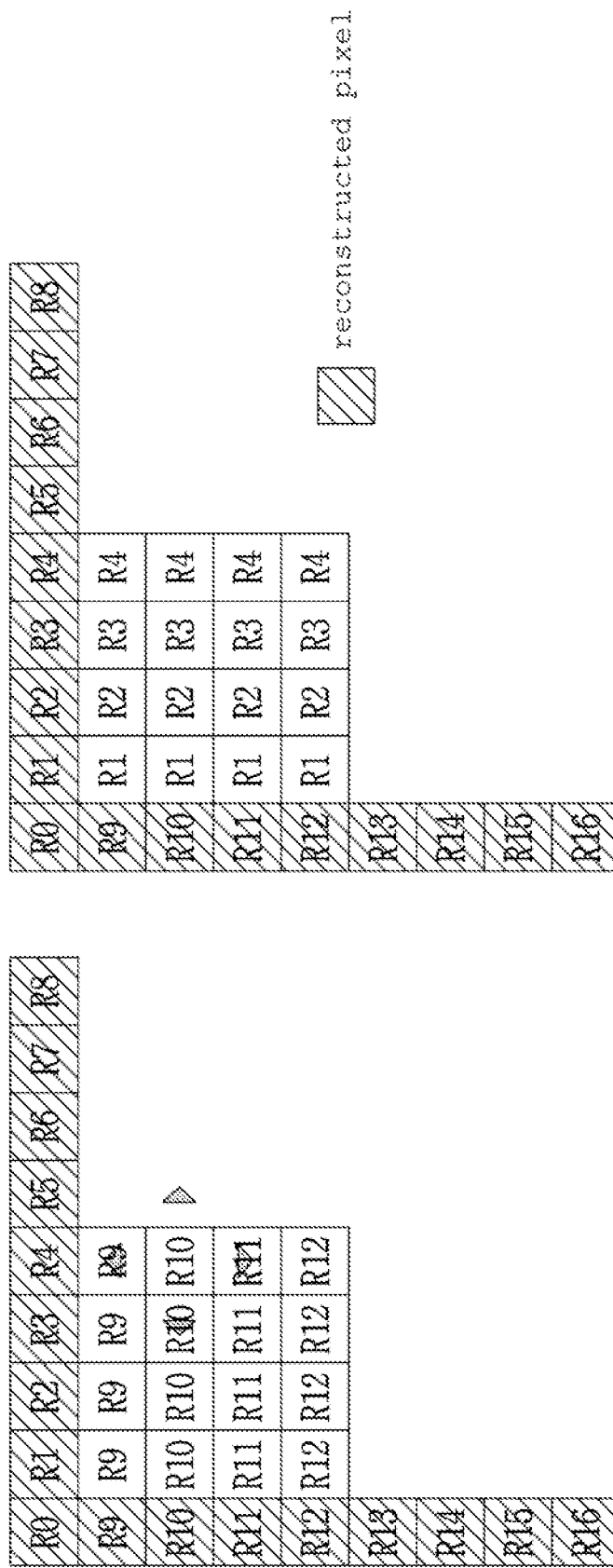
FIG. 5 is a view illustrating an intra prediction method based on a horizontal mode and a vertical mode.

FIG. 5 is a view illustrating an example of generating a prediction block using mode 10 (horizontal mode) and mode 26 (vertical mode) in FIG. 2. In the case of using mode 10, each reference pixel adjacent to the left of the current block is copied rightward to generate a prediction block of the current block. Similarly, in the case of mode 26, each reference block adjacent to the top of the current block is copied downward to generate a prediction block of the current block.

Referring back to FIG. 1, the inter prediction unit 103 may predict a prediction unit on the basis of information of at least one of a previous picture and a following picture of the current picture, and also may be predict a prediction unit on the basis of the information of the partially encoded area in the current picture. The inter prediction unit 103 may include a reference picture interpolation unit, a motion prediction unit, and a motion compensation unit.

The reference picture interpolation unit may generate receives reference picture information from the memory 112 and generates pixel information of integer pixels or sub-pixels from the reference picture. In the case of a luminance pixel, a DCT-based 8-tap interpolation filter having different filter coefficients may be used to generate pixel information on sub-pixels on a per ¼-pixel basis. In the case of a chrominance pixel, a DCT-based 4-tap interpolation filter having different filter coefficients may be used to generate pixel information on sub-pixels on a per ⅛-pixel basis.

The motion prediction unit performs motion prediction on the basis of a reference picture interpolated by a reference picture interpolation unit. Various methods such as full search-based block matching algorithm (FBMA), three step search (TSS), and new three-step search algorithm (NTS) may be used to calculate motion vectors. The motion vector has a motion vector value per ½-pixel or ¼-pixel, on the basis of the interpolated pixel. In the motion prediction unit, the current prediction unit may be predicted by using different motion prediction methods. Various methods such as a skip method, a merge method, an advanced motion vector prediction (AMVP) method, and the like may be used as the motion prediction method.

The subtractor 104 generates a residual block of the current block by subtracting the prediction block generated by the intra prediction unit 102 or the inter-picture prediction unit 103 from the current encoding target block.

In the transformation unit 105, a transform block may be generated by transforming a residual block, which is a difference between an original block and a prediction block.

The transform block may be the smallest unit in which the transform and quantization process is performed. The transformation unit 105 may transform the residual signal into the frequency domain to generate a transform block including the transform coefficients. A transform method such as Discrete Cosine Transform (DCT), Discrete Sine Transform (DST), Karhunen-Loeve Transform (KLT), and the like may be used to transform the residual block including the residual data into the frequency domain. The transform coefficients may be generated by transforming the residual signal into the frequency domain using the transform method. Matrix operations using a basis vector may be performed to easily perform the transformation. Depending on which prediction mode the prediction block is encoded in, the transformation methods may be used in various ways when performing a matrix operation. For example, the transform method may be determined on the basis of the intra prediction mode of the prediction unit used to generate the residual block. For example, DCT may be used for the horizontal direction, and DST may be used for the vertical direction, depending on the intra prediction mode.

The quantization unit 106 may quantize the values transformed into the frequency domain by the transformation unit 105. That is, the quantization unit 106 may quantize transform coefficients of the transform block generated from the transformation unit 105 to generate a quantized transform block having the quantized transform coefficients. As the quantization method, dead zone uniform threshold quantization (DZUTQ) or a quantization weighted matrix may be used. Alternatively, various quantization methods such as an improved quantization method may be used. The quantization coefficient may vary depending on the block or the importance of the image. The values calculated by the quantization unit 106 may be provided to a dequantization unit 108 and an entropy encoding unit 107.

The transformation unit 105 and/or the quantization unit 106 may be optionally included in the image encoding apparatus 100. That is, the image encoding apparatus 100 may perform at least one of transformation or quantization on the residual data of the residual block, or skip both the transformation and the quantization, thereby encoding the residual block. In the image encoding apparatus 100A, even when any one of transform and quantization is not performed, or both transform and quantization are not performed, a block received as an input of the entropy encoding unit 107 is typically referred to as a transform block.

The entropy encoding unit 107 entropy-encodes the input data. The entropy encoding unit 107 may encode the quantized transform block to output a bitstream. That is, the entropy encoding unit 107 may encode the quantized transform coefficients of the quantized transform block output from the quantization unit 106 using various encoding techniques such as entropy encoding. Further, the entropy encoding unit 107 may encode additional information (e.g., prediction mode information, quantization coefficient, etc.) required for decoding the corresponding block in the image decoding apparatus described later. For entropy encoding, various encoding methods such as exponential-Golomb, context-adaptive variable length coding (CAVLC), and context-adaptive binary arithmetic coding (CABAC) may be used.

The entropy encoding unit 107 may encode a variety of information, such as residual coefficient information and block type information, prediction mode information, partition unit information, prediction unit information, transmission unit information, motion vector information, prediction frame information, block interpolation information, and filtering information of the encoding unit from the prediction units 102 and 103. In the entropy encoding unit 107, coefficients of the transform block are encoded on the basis of various types of flags indicating a non-zero coefficient, a coefficient whose absolute value is 1 or greater than 2 in units of a partial block in the transform block, a sign of the coefficient, and the like. The coefficient not encoded with only the flags may be encoded through the absolute value of a difference between the coefficient encoded through the flag and the coefficient of the actual transform block. The dequantization unit 108 and the inverse transformation unit 109 dequantizes values quantized by the quantization unit 106 and inverts values transformed by the transformation unit 105. The residual value generated in the dequantization unit 108 and the inverse transformation unit 109 is summed with a prediction unit predicted through a motion predictor, a motion compensator, and an intra prediction unit 102, which are included in the prediction units 102 and 103, thereby generating reconstructed block. The adder 110 adds the prediction blocks generated by the prediction units 102 and 103 and the residual blocks generated through the inverse transformation unit 109 to generate reconstructed blocks.

The filter unit 111 may include at least one of a deblocking filter, an offset correction unit, and an adaptive loop filter (ALF).

The deblocking filter may remove the block distortion caused by the boundary between the blocks in the reconstructed picture. It may be determined whether or not a deblocking filter is applied to a current block on the basis of pixels included in several columns or rows included in the block to determine whether to perform deblocking. When the deblocking filter is applied to a block, a strong filter or a weak filter may be applied according to the deblocking filtering strength required. In applying the deblocking filter, horizontal filtering and vertical filtering may be performed concurrently in performing vertical filtering and horizontal filtering.

The offset correction unit may correct the offset between the deblocked image and the original image on a per pixel basis. In order to perform offset correction for a specific picture, pixels included in an image are divided into a predetermined number of areas, an area on which offset is performed is then determined, and an offset is performed on the area. Alternatively, the offset may be applied to edge information of each pixel.

Adaptive loop filtering (ALF) may be performed on the basis of a value obtained by comparing the filtered reconstructed image with the original image. After dividing the pixels included in the image into a predetermined number of pixel groups, one filter to be applied to each group may be determined and filtering may be performed differently for each group. The information on whether to apply the ALF is provided such that luminance signal may be transmitted for each coding unit (CU), and the shape and the filter coefficient of the ALF filter to be applied may be varied according to each block. Also, the ALF of the same type (fixed type) may be applied irrespective of characteristics of the target blocks to be filtered.

The memory 112 may store a reconstructed block or picture calculated through the filter unit 111, and the reconstructed block or picture may be provided to the prediction units 102 and 103 when inter prediction is performed.

The intra prediction unit 102 and the inter prediction unit 103 may be collectively referred to as a prediction unit. The prediction unit may generate a prediction block using the neighboring pixels of the current block or the reference picture that has been already decoded. A prediction block may generate one or more prediction blocks in the current block. When there is only one prediction block in the current block, the prediction block may have the same shape as the current block. When a prediction block is generated, a residual block corresponding to a difference between the current block and the prediction block may be generated. By applying various techniques such as rate-distortion optimization (RDO) to the generated residual block, the optimal prediction mode may be determined. For example, the following equation 1 may be used for the calculation of RDO.

$$J(\emptyset,\lambda)=D(\emptyset)+\lambda R(\emptyset) \qquad \text{[Equation 1]}$$

In Equation 1, D( ), R( ) and JO denote the deterioration due to quantization, the rate of the compressed stream, and the RD cost, respectively. $\Phi$ denotes an encoding mode. $\lambda$ is a Lagrangian multiplier and is used as a scale correction coefficient for matching the units between error amount and bit amount. In order to be selected as the optimal encoding mode in the encoding process, the J( ), that is, the RD cost when the corresponding mode is applied, must be smaller than that when the other modes are applied. A bit rate and error may be considered simultaneously when calculating the RD cost.

Figure 6:
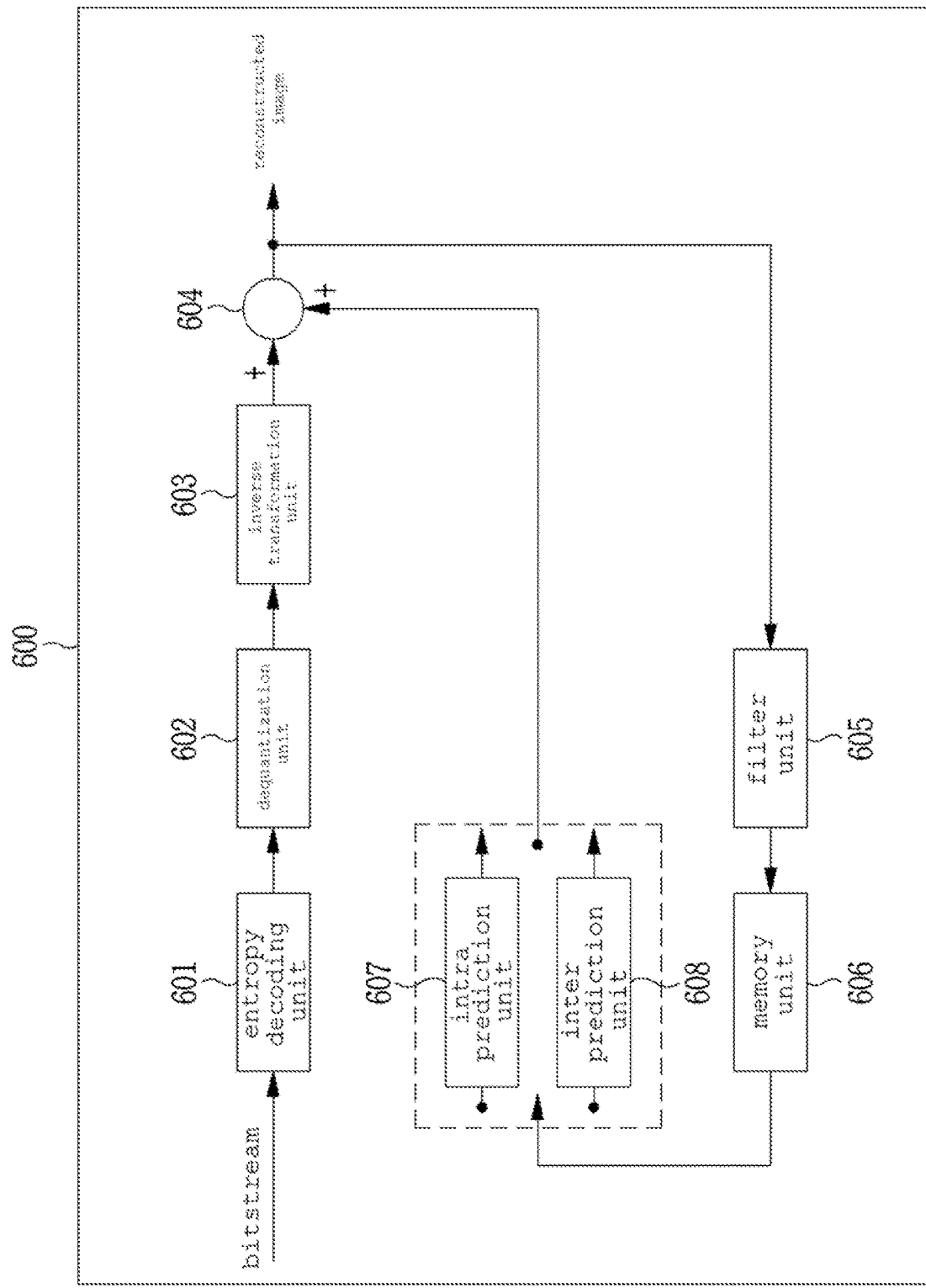
FIG. 6 is a schematic block diagram of a video decoding apparatus according to an embodiment of the present invention.

FIG. 6 is a block diagram illustrating a video decoding apparatus 600 according to an embodiment of the present invention.

Referring to FIG. 6, an image decoding apparatus 600 includes an entropy decoding unit 601, a dequantization unit 602, an inverse transformation unit 603, an adding unit 604, a filter unit 605, a memory 606, and prediction units 607 and 608.

When the image bit stream generated by the image encoding apparatus 100 is input to the image decoding apparatus 600, the input bit stream is decoded according to a process opposite to that performed by the image encoding apparatus 100.

The entropy decoding unit 601 performs entropy decoding in a procedure opposite to that in which entropy encoding is performed in the entropy encoding unit 107 of the image encoding apparatus 100. For example, various methods such as exponential-Golomb, context-adaptive variable length coding (CAVLC), and context-adaptive binary arithmetic coding (CABAC) may be applied in accordance with the method performed by the image encoder. The entropy decoding unit 601 decodes coefficients of the transform block on the basis of a value other than 0, a coefficient having an absolute value greater than 1 or 2 for each partial block within the transform block, and various types of flags indicating a sign of the coefficient. The coefficient not represented with only the flags may be decoded by summing a coefficient represented by a flag and a signaled coefficient.

The entropy decoding unit 601 may decode information related to intra prediction and inter prediction performed in the encoder.

The dequantization unit 602 performs dequantization on the quantized transform block to generate a transform block and operates substantially the same as the dequantization unit 108 of FIG. 1.

The inverse transformation unit 603 performs inverse transform on the transform block to generate a residual block. Here, the transform method may be determined on the basis of information on a prediction method (inter or intra prediction), size and/or type of a block, intra prediction mode, and the like and operates substantially the same as the inverse transformation unit 109 of FIG. 1.

The adder 604 adds the prediction block generated in the intra prediction unit 607 or the inter prediction unit 608 and the residual block generated through the inverse transformation unit 603 to generate a reconstruction block and operates substantially the same as the adder 110 of FIG. 1.

The filter unit 605 reduces various types of noise occurring in the reconstructed blocks.

The filter unit 605 may include a deblocking filter, an offset correction unit, and an ALF.

When information on whether or not a deblocking filter is applied to a corresponding block or picture from the image encoding apparatus 100 and a deblocking filter are applied, information on whether a strong filter or a weak filter is applied is received. The deblocking filter of the image decoding apparatus 600 receives the deblocking filter related information provided by the image encoding apparatus 100, and the image decoding apparatus 600 performs deblocking filtering on the corresponding block.

The offset correction unit performs offset correction on the reconstructed image on the basis of the type and offset value information of the offset correction applied to the image when performing encoding.

The ALF may be applied to a coding unit on the basis of information on whether to apply ALF, ALF coefficient information, and the like provided from the image encoding apparatus 100. Such ALF information may be included in a specific set of parameters. The filter unit 605 operates substantially the same as the filter unit 111 of FIG. 1.

The memory 606 stores reconstructed blocks generated by the adder 604 and operates substantially the same as the memory 112 of FIG. 1.

The prediction units 607 and 608 may generate a prediction block on the basis of the prediction block generation related information provided by the entropy decoding unit 601 and the previously decoded block or picture information provided by the memory 606.

The prediction units 607 and 608 may include an intra prediction unit 607 and an inter prediction unit 608. Although not shown separately, the prediction units 607 and 608 may further include a prediction unit discriminator. The prediction unit discriminator receives various information such as prediction unit information input from the entropy decoding unit 601, prediction mode information of the intra prediction method, motion prediction related information of the inter prediction method, identifies a prediction unit from the current coding unit, and discriminate whether the prediction unit performs inter prediction or intra prediction. The inter prediction unit 608 uses the information required for inter prediction of the current prediction unit provided by the image encoding apparatus 100 to perform inter prediction for the current prediction unit on the basis of information included in at least one of the previous picture or the following picture of the current picture including the current prediction unit. Alternatively, inter prediction is performed on the basis of information of a partial area that has been already reconstructed within the current picture including the current prediction unit.

In order to perform inter prediction, it is determined which method of a skip mode, a merge mode, and an AMVP mode is used, as a motion prediction method of a prediction unit included in the corresponding coding unit on the basis of an coding unit.

The intra prediction unit 607 generates a prediction block using reconstructed pixels located around the current block to be encoded.

The intra prediction unit 607 may include an adaptive intra smoothing (AIS) filter, a reference pixel interpolator, and a DC filter. The AIS filter is a filter that performs filtering on the reference pixels of the current block, and may adaptively determine whether to apply the filter according to the prediction mode of the current prediction unit. The AIS filtering may be performed on the reference pixel of the current block using the prediction mode of the prediction unit provided in the image encoding apparatus 100 and the AIS filter information. When the prediction mode of the current block is a mode that does not perform AIS filtering, the AIS filter may not be applied.

The reference pixel interpolator of the intra prediction unit 607 interpolates a reference pixel to generate a reference pixel at a position of a fractional unit, when the prediction mode of the prediction unit is a prediction unit performing intra prediction on the basis of a pixel value obtained by interpolating a reference pixel. The generated reference pixel at the fractional unit position may be used as a prediction pixel of the pixel in the current block. The reference pixel may not be interpolated, when the prediction mode of the current prediction unit is a prediction mode generating a prediction block without interpolating the reference pixel. The DC filter may generate a prediction block through filtering when the prediction mode of the current block is DC mode.

The intra prediction unit 607 operates substantially the same as the intra prediction unit 102 of FIG. 1.

The inter prediction unit 608 generates an inter prediction block using the reference picture and the motion information stored in the memory 606. The inter prediction unit 608 operates substantially the same as the inter prediction unit 103 of FIG. 1.

The present invention particularly relates to boundary processing of padding and image, and various embodiments of the present invention will be described in more detail below with reference to the drawings.

According to an embodiment of the present invention, a preprocessing process may be performed before encoding target image is input to the image partition unit 101 of FIG. 1. The encoding target image may have various horizontal and vertical lengths of a pixel unit. However, since the encoding and decoding of an image are performed in any block unit rather than a pixel unit, a padding process may be required to adjust the size of the encoding target image on a per-block basis.

Figure 7:
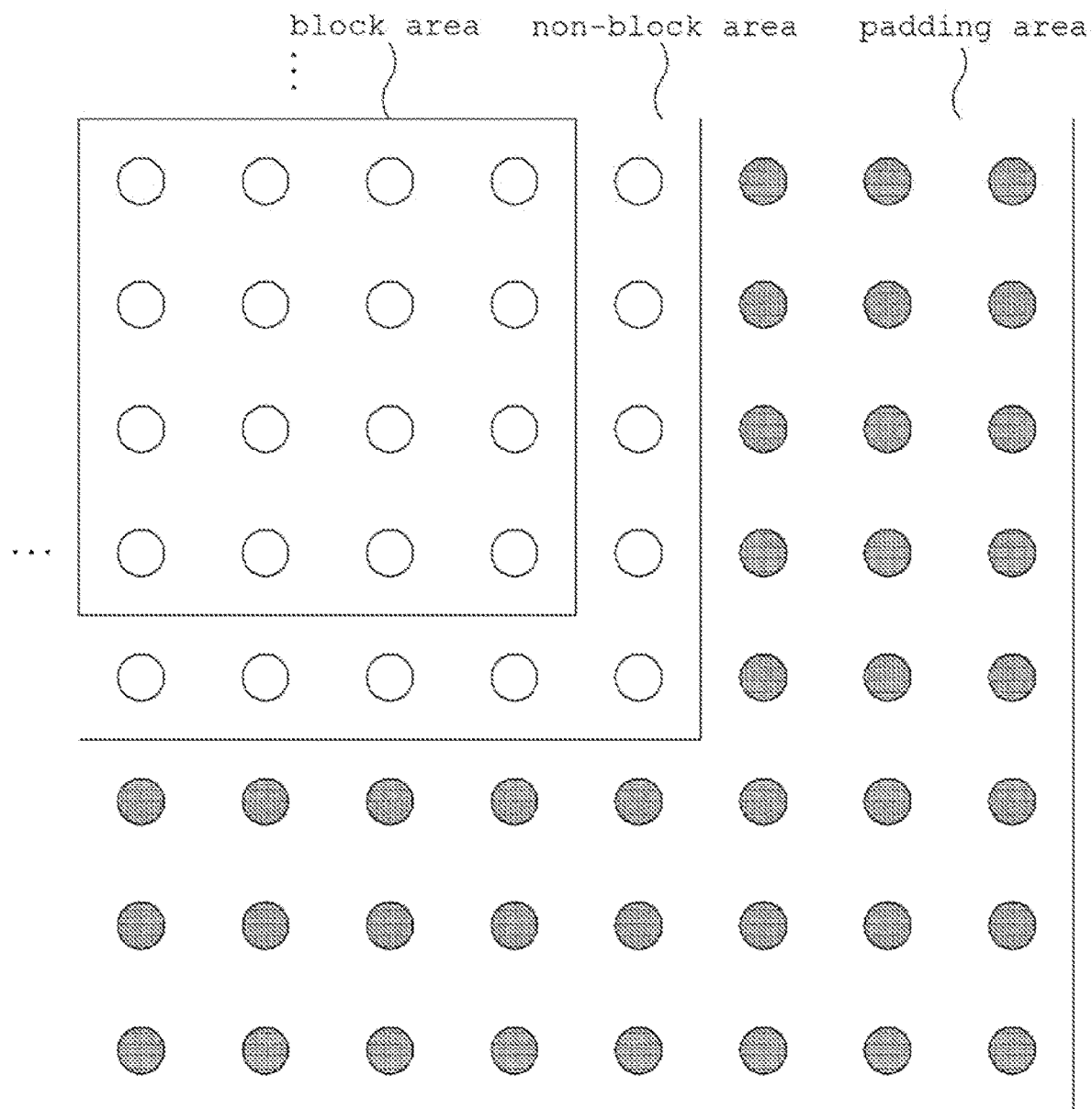
FIG. 7 is a view illustrating a padding process according to an embodiment of the present invention.

FIG. 7 is a view illustrating a padding process according to an embodiment of the present invention.

In the example shown in FIG. 7, the encoding target image includes a block area and a non-block area. The preprocessing process is performed on the encoding target image, so that a padded area may be added. The encoding target image to which the padded area is added may be input to the image partition unit 101 of FIG. 1.

In the example shown in FIG. 7, the smallest block unit may be 4×4. The horizontal or vertical length of the block may be $2^n$. Thus, for example, when the horizontal and vertical lengths of the encoding target image is 9 and the length of the encoding target image is 9 respectively, one column in right and one row in the bottom of the encoding target image may be non-block areas not included in the block area. In this manner, when the encoding target image includes a non-block area, padding may be performed in consideration of the size of the smallest block. Thus, by performing the padding considering the size of the block, the padded encoding target image does not include the non-block area. The padded encoding target image is input to the image partition unit 101 of FIG. 1 and is partitioned into a plurality of blocks, so that encoding may be performed on a per block basis.

Figure 8A:
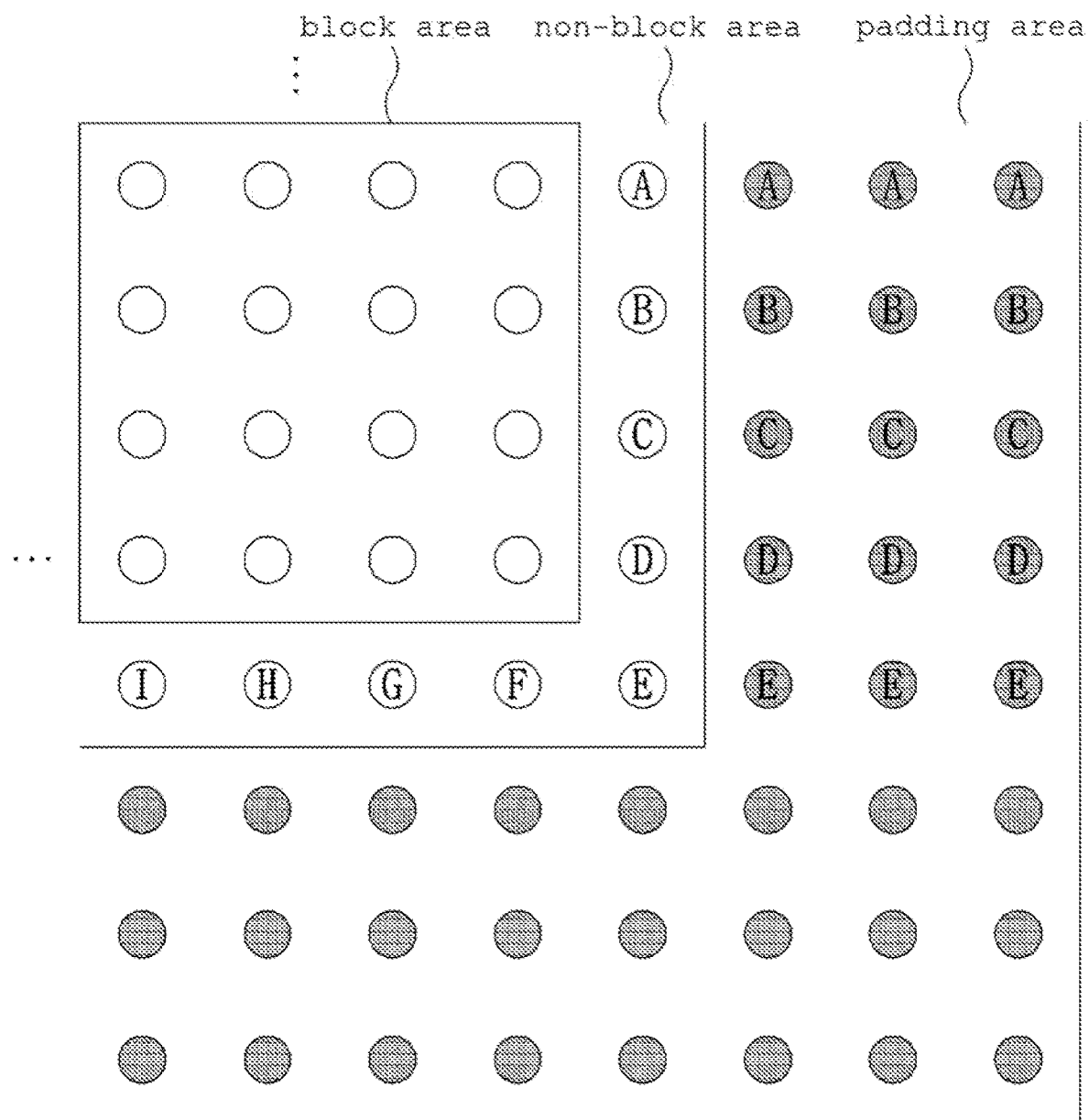
FIGS. 8a and 8b are views illustrating a padding process according to the present invention.
Figure 8B:
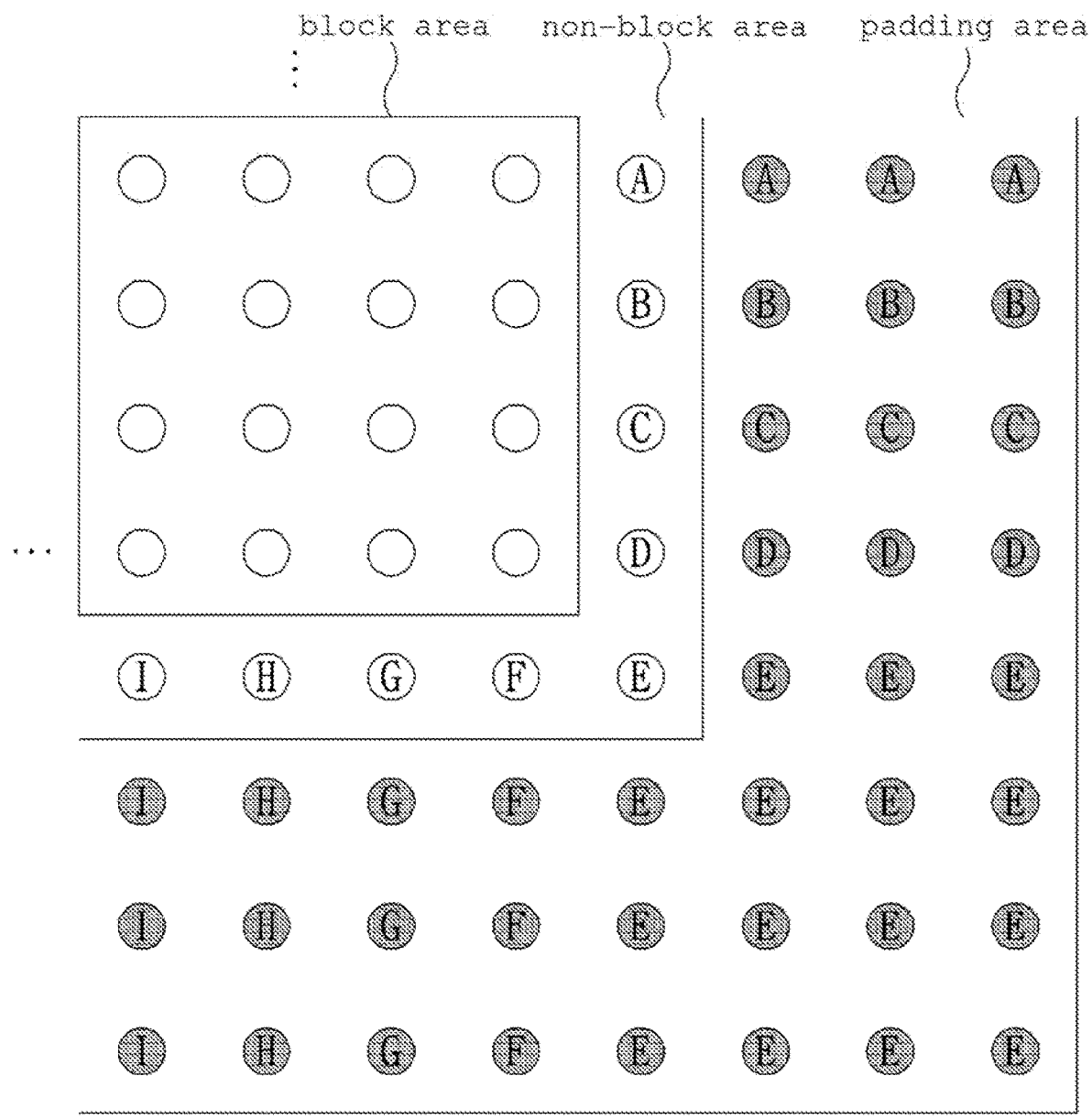

FIGS. 8a and 8b are views illustrating a padding process according to the present invention.

First, padding may be performed in the horizontal direction using the pixel closest to the pixel to be padded. In the example shown in FIG. 8a, the three padding target pixels in the most top may be padded using the pixel A of the non-block area adjacent to the left.

After that, padding may be performed in the vertical direction using the pixel closest to the pixel to be padded. In the example shown in FIG. 8b, three padding target pixels in the leftmost area may be padded using the pixel I of the non-block area adjacent to the top.

In the above example, the padding process from the horizontal direction to the vertical direction has been described. However, the present invention is not limited to this, and padding from the vertical direction to the horizontal direction may be performed. The size of the smallest block may be a block unit or a sub-block unit to be described with reference to FIG. 9.

Figure 9:
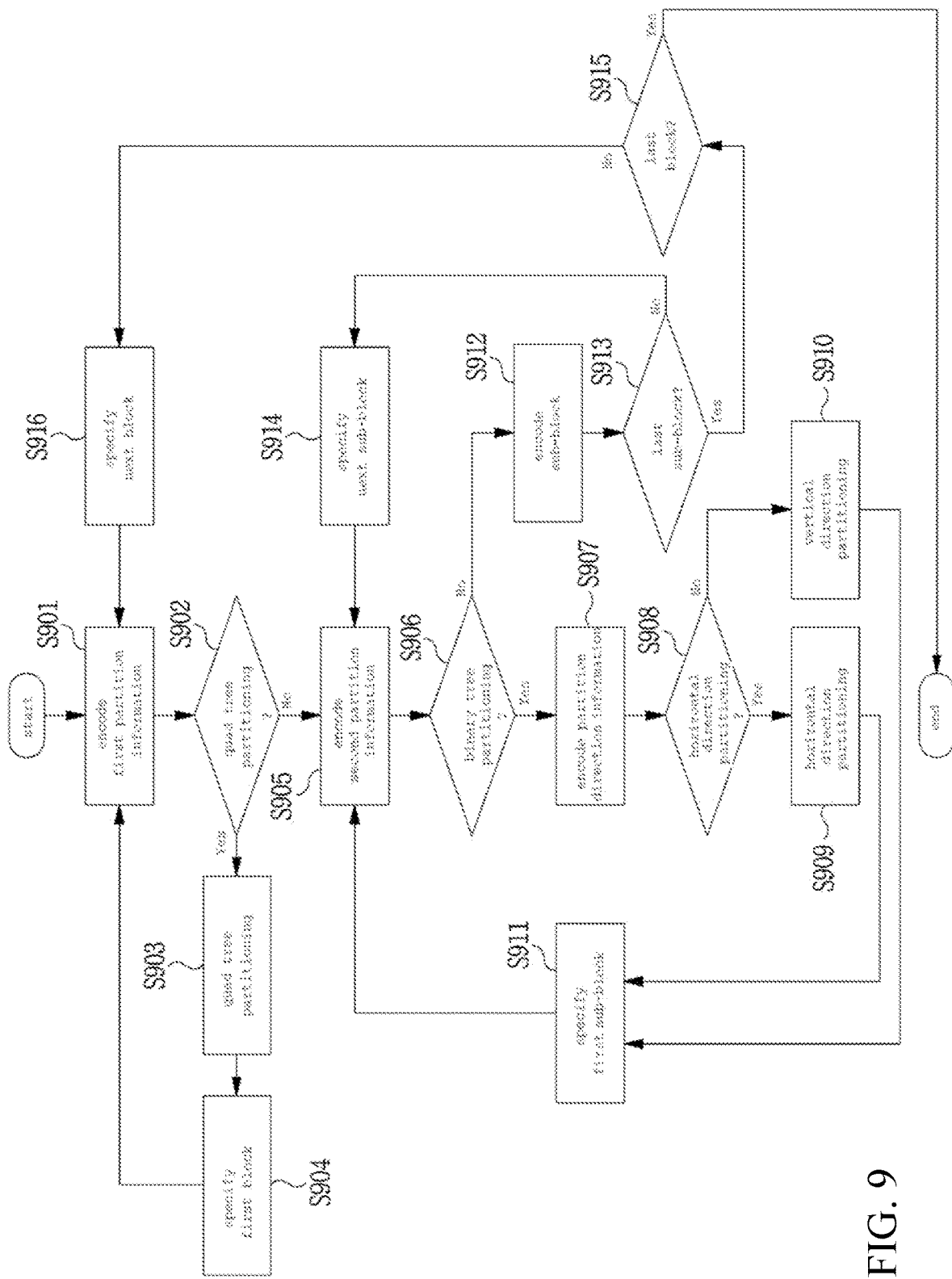
FIG. 9 is a view illustrating an operation of the image partitioning unit 101 of FIG. 1.

FIG. 9 is a view illustrating the operation of the image partition unit 101 of FIG. 1.

The input image may be partitioned into a plurality of largest blocks. The size of the largest block may be predefined or signaled through the bitstream. For example, when the size of the input image is 128×128 and the size of the largest block is 64×64, the input image may be partitioned into four largest blocks.

Each largest block is input to the image partition unit 101 of FIG. 1 and may be partitioned into a plurality of blocks. The input image may not be partitioned into a plurality of largest blocks but may be directly input to the image partition unit 101. The minimum size of a partitioned block and/or the maximum size of the block that may be partitioned into sub-blocks may be preset or may be signaled from the upper level header of the block. The upper level may be at least one of a video, a sequence, a picture, a slice, a tile, and a largest coding unit (LCU).

The current block may be partitioned into four sub-blocks or two sub-blocks.

The partitioning of the current block into four sub-blocks may be referred to as quad-tree partitioning. The current block may be partitioned into four sub-blocks of the same size using quad tree partitioning. The first partition information is information indicating whether or not the quad tree partitioning is performed for the current block. The first partition information may be, for example, a flag of 1 bit.

The partitioning of a current block into two sub-blocks may be referred to as binary tree partitioning. The current block may be partitioned into two sub-blocks of the same or different size by binary tree partitioning. The second partition information is information indicating whether or not to perform binary tree partitioning on the current block. The second partition information may be, for example, a flag of 1 bit. When the current block is partitioned by binary tree, the partition direction information may be further signaled. The partition direction information may indicate whether the partitioning of the current block is performed in a horizontal direction or in a vertical direction. The partition direction information may be, for example, a flag of 1 bit. When the current block is partitioned into two sub-blocks with different sizes, the partition type information may be further signaled. The partition type information may indicate a partition ratio of two sub-blocks.

The current block may be recursively partitioned using quad tree partitioning and binary tree partitioning. For example, when the current block is partitioned into four sub-blocks by quad tree partitioning, each sub-block may be recursively quad tree partitioned, binary tree partitioned, or not partitioned. When the current block is partitioned into two sub-blocks by binary tree partitioning, each sub-block may be recursively quad tree partitioned, binary tree partitioned, or not partitioned. Alternatively, quad tree partitioning may not be performed on sub-blocks generated by binary tree partitioning.

The encoder may determine whether or not to perform quad tree partitioning on the input current block. The first partition information may be encoded on the basis of the determination (S901). When the current block is quad tree partitioned (Yes in S902), the current block may be quad tree partitioned into four blocks (S903). Each of the four blocks generated using the quad tree partition may be inputted again to the step S901 in a predetermined order (S904 and S916). The predetermined order may be a Z-scan order. In step S904, the first block according to the predetermined order among the four blocks is specified and input as the current block in step S901.

When the current block is not partitioned using the quad tree (No in S902), the encoder determines whether or not to perform binary tree partitioning on current block. The second partition information is encoded on the basis of the determination (S905). When the current block is partitioned using binary tree partitioning (Yes in S906), the encoder determines whether to partition the current block horizontally or vertically, and encodes the partition direction information on the basis of the determination (S907). When the current block is partitioned horizontally (Yes in S908), the horizontal partitioning for the current block may be performed (S909). Otherwise (No in S908), the vertical partition for the current block may be performed (S910). When the binary tree partition type for the current block is an asymmetric partition, the partition ratio is determined and partition type information may be further encoded. In this case, steps S909 and S910 may be performed in consideration of the partition type information. Each of the two sub-blocks generated by binary tree partitioning may be input to the step S905 again according to a predetermined order (S911 and S914). The predetermined order may be left to right, or top to bottom. In step S911, the first sub-block according to the predetermined order among the two sub-blocks is specified and input as the current block in step S905. When the quad tree partition is allowed again for the sub-block generated by binary tree partitioning, each of the two blocks generated by binary tree partitioning may be input to step S901 according to a predetermined order.

When the current block is not binary tree partitioned (No in S906), encoding may be performed on the current block or the current sub-block (S912). The encoding in step S912 may include prediction, transform, quantization, and the like.

When the sub-block encoded in step S912 is not the last sub-block generated by the binary tree partition (No in step S913), the next sub-block generated by the binary tree partition is specified and input as a current block to step S905 (S914).

When the sub-block encoded in step S912 is the last sub-block generated by the binary tree partition (Yes in S913), whether the block to which the encoded sub-block belongs is the last block among the block generated by quad tree partitioning is determined (S915). When it is the last block (Yes in S915), the encoding for the largest block or the current image input to step S901 may be ended. When it is not the last block (No in S915), the next block generated by quad tree partitioning is specified and may be input as a current block to step S901 (S916).

Figure 10:
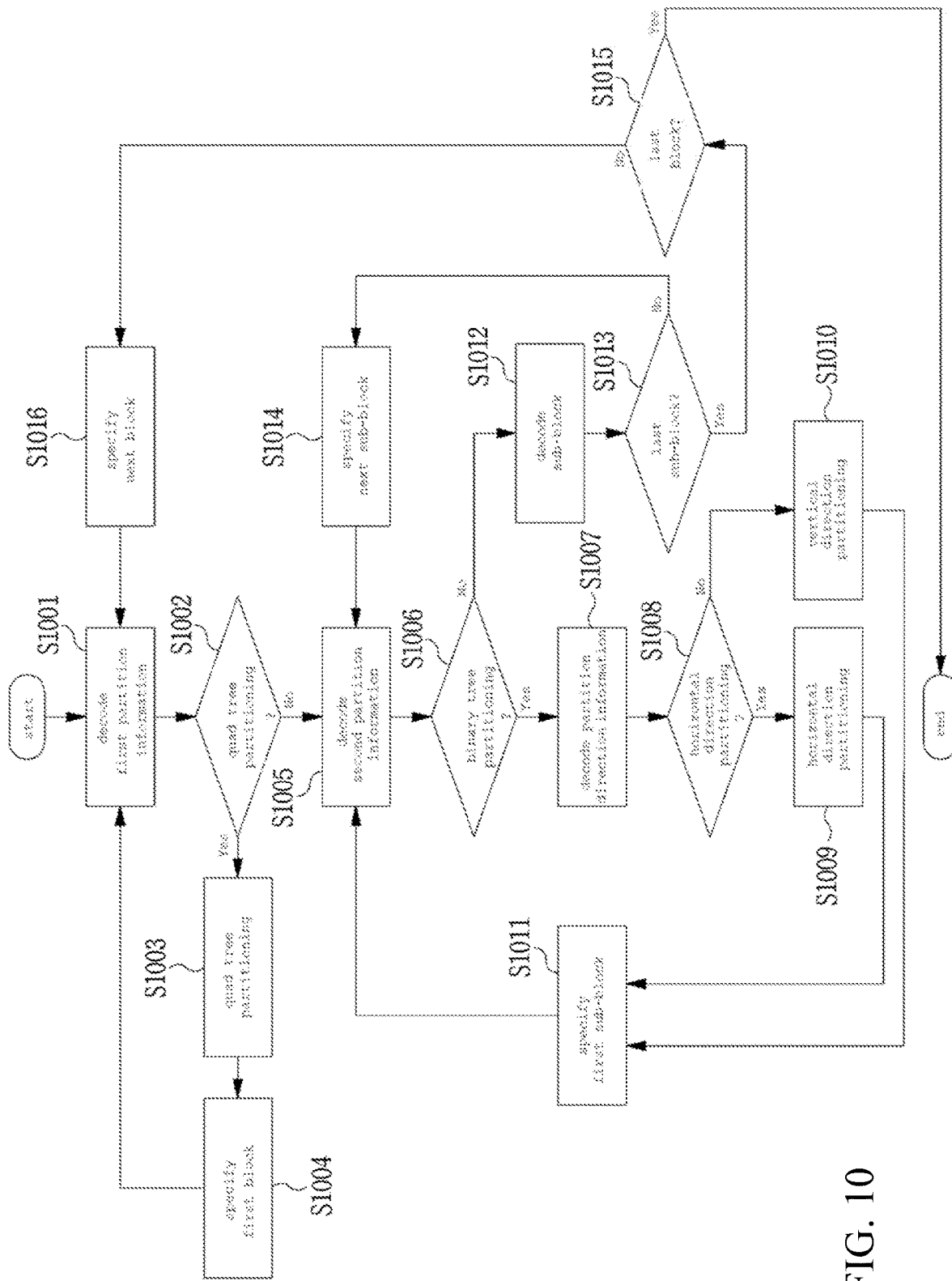
FIG. 10 is a view illustrating an operation in the decoder according to the present invention.

FIG. 10 is a view illustrating operations in a decoder according to the present invention.

The decoder may decode the first partition information of the input current block (S1001). When the current block is quad tree partitioned (Yes in S1002), the current block may be partitioned into four blocks using quad tree partitioning (S1003). Each of the four blocks generated by quad tree partitioning may be input again to the step S1001 according to a predetermined order (S1004, S1016). The predetermined order may be a Z-scan order. In step S1004, the first block according to the predetermined order among the four blocks is specified and input as a current block to step S1001.

When the current block is not partitioned using quad tree partitioning (No in S1002), the decoder may decode the second partition information of the current block (S1005). When the current block is binary tree partitioned (Yes in S1006), the decoder may decode the partition direction information (S1007). When the current block is partitioned horizontally (Yes in S1008), the horizontal partitioning may be performed on the current block (S1009). Otherwise (No in S1008), the vertical partitioning may be performed on the current block (S1010). When the binary tree partition type for the current block is an asymmetric partition, the partition type information may be further decoded. In this case, steps S1009 and S1010 may be performed in consideration of the partition type information. Each of the two sub-blocks generated by binary tree partitioning may be input again to step S1005 according to a predetermined order (S1011, S1014). The predetermined order may be left to right, or top to bottom. In step S1011, the first sub-block according to the predetermined order among the two sub-blocks is specified and input as a current block to step S1005. When the quad tree partition is allowed again for the sub-block generated by the binary tree partition, each of the two blocks generated by the binary tree partition may be input to step S1001 according to a predetermined order.

When the current block is not binary tree partitioned (No in S1006), decoding may be performed (S1012) on the current block or the current sub-block. The decoding in step S1012 may include prediction, dequantization, inverse transform, and the like.

When the sub-block decoded in step S1012 is not the last sub-block generated by binary tree partitioning (No in step S1013), the next sub-block generated by binary tree partitioning is specified and input as a current block to step S1005 (S1014).

When the sub-block decoded in step S1012 is the last sub-block generated by binary tree partitioning (Yes in S1013), whether the block to which the decoded sub-block belongs is the last block among the blocks generated by quad tree partitioning is determined (S1015). When it is the last block (Yes in S1015), the decoding for the largest block or the current image input in the step S1001 may be ended. When it is not the last block (No in S1015), the next block generated by quad tree partitioning is specified and input as a current block to step S1001 (S1016).

Figure 11:
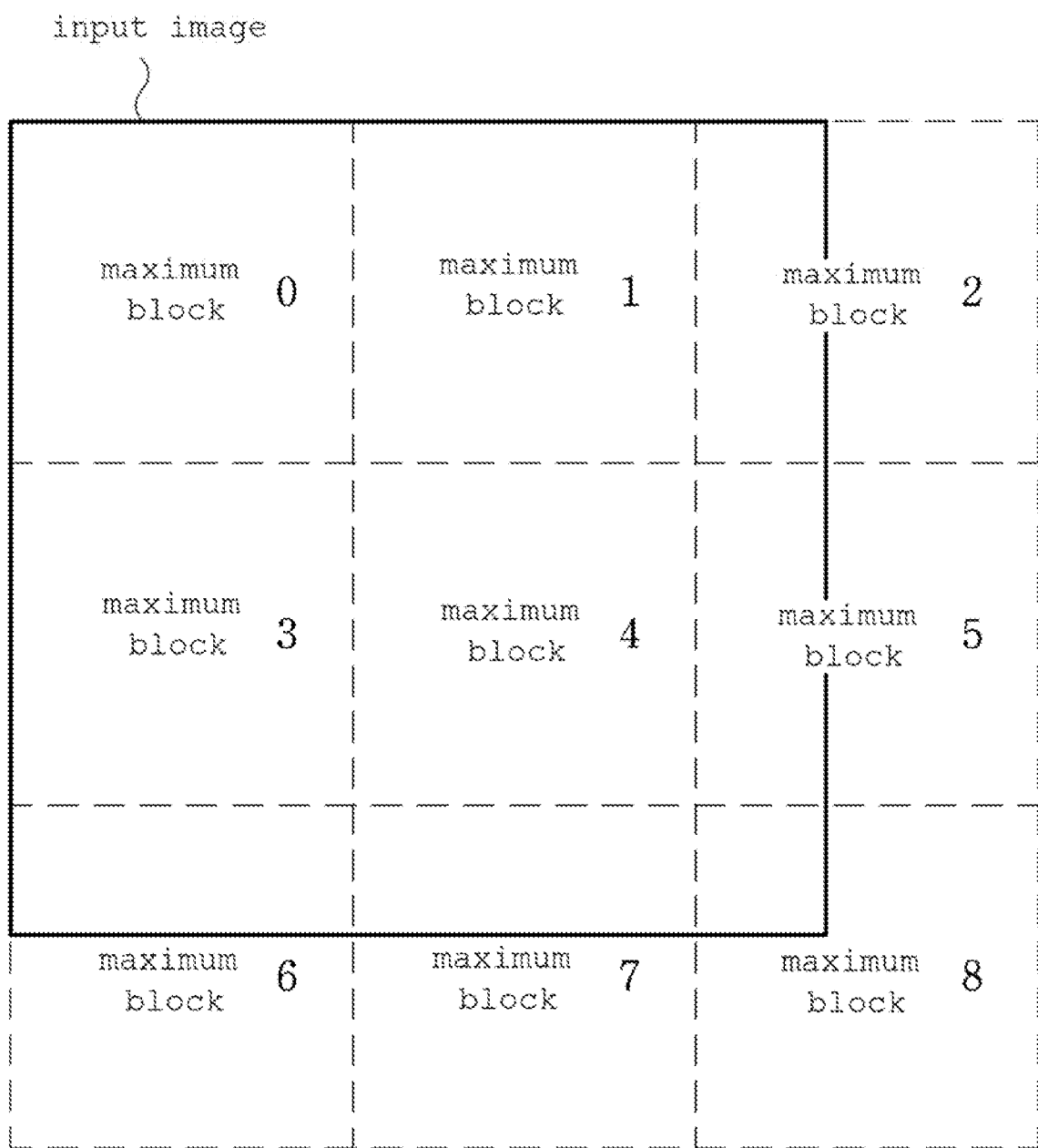
FIG. 11 is a view illustrating a case where the size of the current image is not a multiple of a size of largest block.

FIG. 11 is a view illustrating a case where the size of the current image is not a multiple of the largest block size.

As shown in FIG. 11, when the current image is partitioned into a plurality of largest blocks, an area corresponding to a part of the largest block size is left on the right or bottom of the current image. That is, in the case of the largest block 2, the largest block 5, the largest block 6, the largest block 7, or the largest block 8, pixels of the current image exist only in the partial area.

Hereinafter, the image partitioning method according to the present invention by which the current image is efficiently partitioned as shown in FIG. 11 will be described.

FIGS. 12a to 12e are views illustrating an image partition method according to an embodiment of the present invention. Hereinafter, referring to FIGS. 12a to 12e, the partitioning method and/or the partition information encoding of the largest block 2 in FIG. 11 will be described. In the following description referring to FIGS. 12a to 12e, it is assumed that the current image size is 146×146, the largest block size is 64×64, the minimum size of a block that may be quad tree partitioned is 16×16, and the minimum size of a sub-block is 2×2.

Figure 12A:
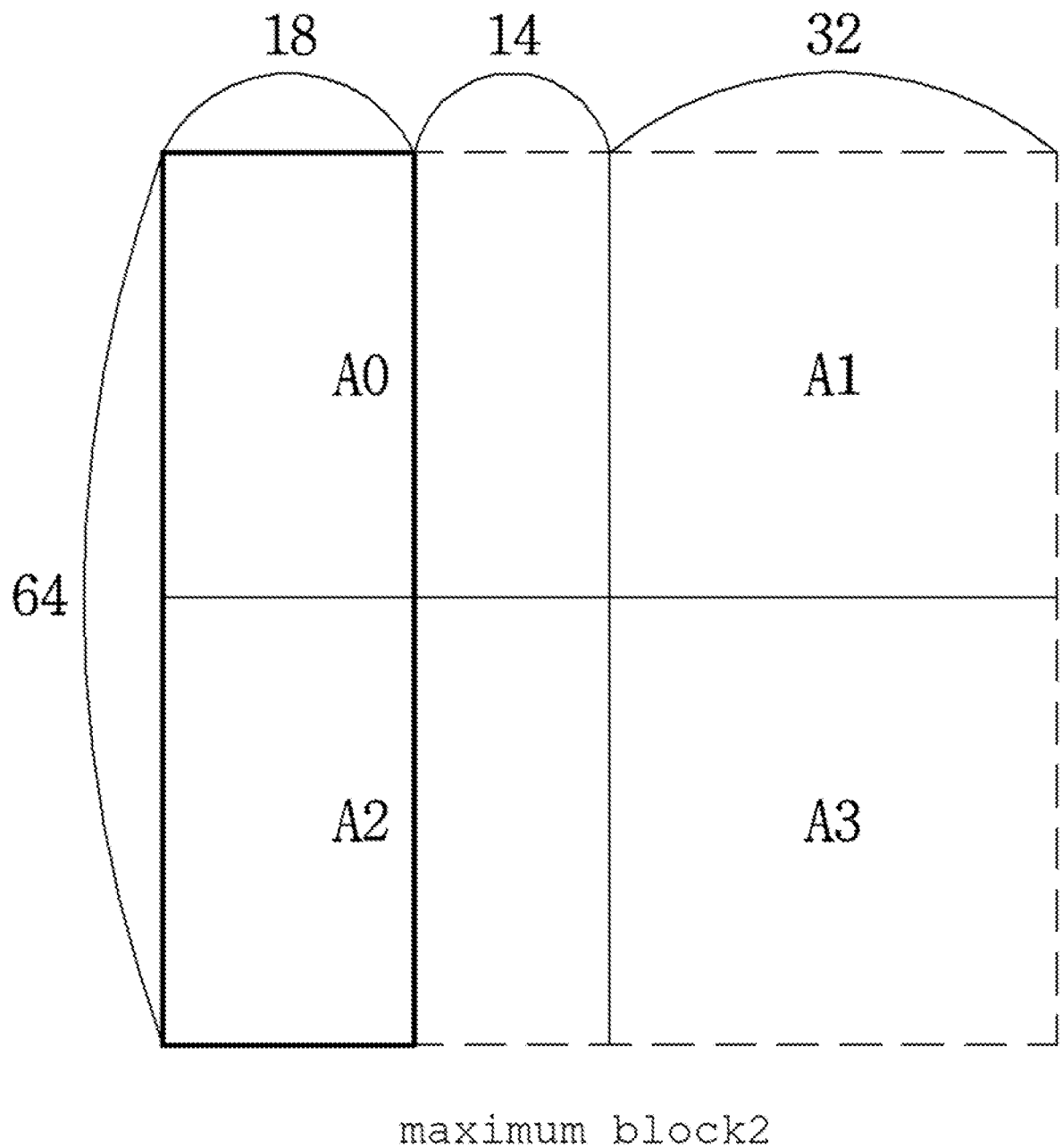
FIGS. 12a to 12e are diagrams illustrating an image partitioning method according to an embodiment of the present invention.

FIG. 12a is an enlarged view of the largest block 2, in which a portion surrounded by a thick line is an area in the current image. The largest block 2 may be the partition target block described with reference to FIG. 9. As shown in FIG. 12a, the rightmost position and the bottommost position of the largest block 2 are not completely included in the area of the current image. Also, the size of the largest block 2 is 64×64, which is a size in which quad tree partitioning is possible. In this case, the largest block 2 may be quad tree partitioned (S903). That is, step S901 for the largest block 2 may be omitted. Then, partitioning and encoding for the block A0, which is the first block among the four blocks (A0, A1, A2, and A3) generated by quad tree partitioning of the largest block 2, may be performed. Since the block A1 and the block A3 are not completely included in the area of the current image, partitioning and encoding may be omitted. The block A2 may be partitioned and encoded according to the present invention like the block A0.

Figure 12B:
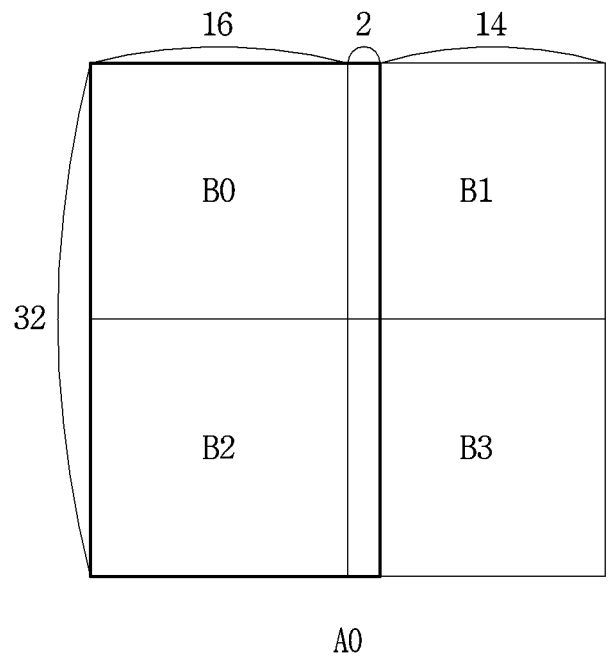

FIG. 12b is an enlarged view of the block A0 in FIG. 12a, and a portion surrounded by a thick line is an area in the current image. The block A0 may be the partition target block described with reference to FIG. 9. As shown in FIG. 12b, the rightmost position B1 and the bottommost position B3 of the block A0 are not completely included in the area of the current image. In addition, the size of the block A0 is 32×32, which is a size in which quad tree partitioning is possible. In this case, the block A0 may be quad tree partitioned (S903). That is, step S901 for block A0 may be omitted. Then, the partitioning and encoding of the block B0 which is the first block among the four blocks B0, B1, B2 and B3 generated by quad tree partitioning of the block A0 may be performed. The block B0 may be partitioned and encoded by the method described with reference to FIG. 9. That is, block B0 may be encoded without being partitioned or with being partitioned by quad tree partitioning and/or binary tree partitioning. The block B2 may be partitioned and encoded according to the present invention like the block B0. Since the block B1 and the block B3 are not completely included in the area of the current image, partitioning and encoding may be omitted. The block B2 may be partitioned and encoded in the same manner as block B0. That is, step S901 cannot be omitted for the block B0 and the block B2. However, for blocks B1 and B3, step S901 may be omitted as described later.

Figure 12C:
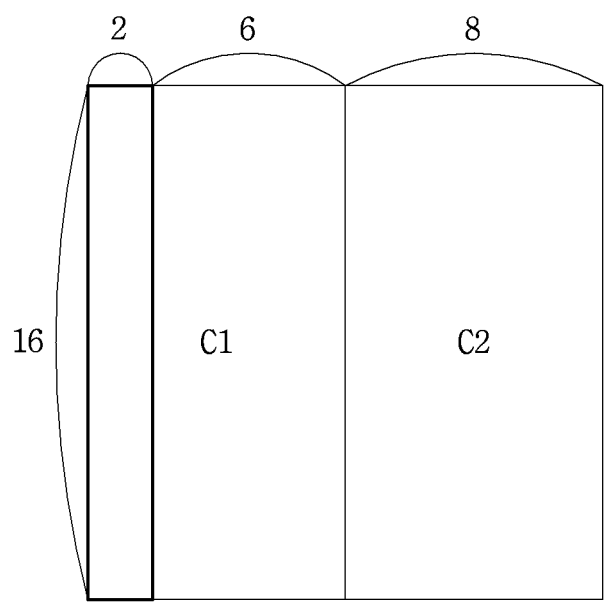

FIG. 12c is an enlarged view of the block B1 in FIG. 12b, in which a portion surrounded by a thick line is an area in the current image. The block B1 may be the partition target block described with reference to FIG. 9. As shown in FIG. 12C, the rightmost position and the bottommost position of the block B1 are not completely included in the area of the current image. In addition, the size of the block B1 is 16×16, which is a size in which quad tree partitioning is impossible. In this case, the block B1 may not be quad tree partitioned, but may be binary tree partitioned. Further, since the encoding target block is a vertically long rectangle, the partition direction may be determined to be a vertical direction. Therefore, steps S901 to S907 may be omitted for the block B1, and the binary tree partitioning in step S909 or S910 may be performed according to the shape of the encoding target block. Thereafter, the partition and coding for the block C1, which is the first one of the two blocks C1 and C2 generated by the binary tree partitioning of the block B1, may be performed. Since the block C2 is not completely included in the area of the current image, partitioning and encoding may be omitted.

Figure 12D:
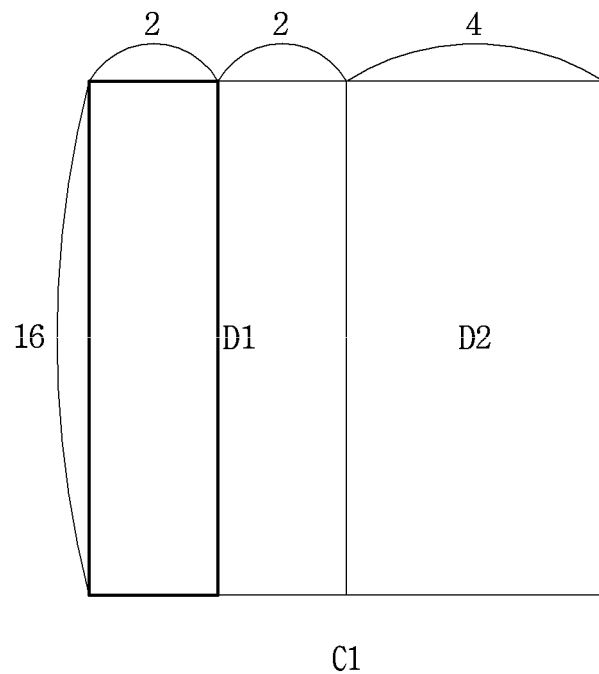

FIG. 12d is an enlarged view of the block C1 of FIG. 12c, in which a portion surrounded by a thick line is an area in the current image. The block C1 may be the partition target block described with reference to FIG. 9. As shown in FIG. 12d, the rightmost position and the bottommost position of the block C1 are not completely included in the area of the current image. In addition, since the binary tree partitioning is applied to the upper block B1 of the block C1, the block C1 may also be binary tree partitioned. Further, since the encoding target block is a vertically long rectangle, the partition direction may be determined to be the vertical direction. Therefore, steps S905 to S907 may be omitted for the block C1, and the binary tree partitioning of step S909 or S910 may be performed according to the shape of the encoding target block. Thereafter, partitioning and encoding for the first block, i.e., block D1, of the two blocks D1 and D2 generated by the binary tree partitioning of the block C1 may be performed. Since the block D2 is not completely included in the area of the current image, partitioning and encoding may be omitted.

Figure 12E:
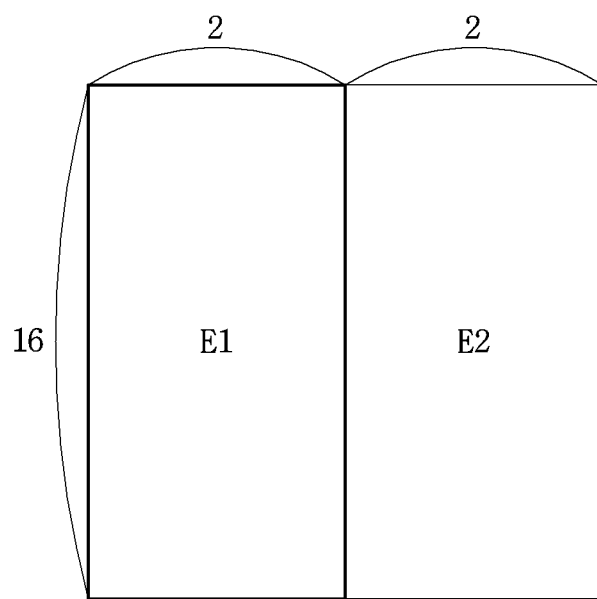

FIG. 12e is an enlarged view of the block D1 in FIG. 12d, in which a portion surrounded by a thick line is an area in the current image. The block D1 may be the partition target block described with reference to FIG. 9. As shown in FIG. 12e, the rightmost position and the bottommost position of the block D1 are not completely included in the area of the current image. In addition, since the binary tree partitioning is applied to C1, which is the upper level block of the block D1, the block D1 may also be binary tree partitioned. Further, since the encoding target block is a vertically long rectangle, the partition direction may be determined to be the vertical direction. Therefore, steps S905 to S907 may be omitted for the block D1, and the binary tree partitioning of step S909 or S910 may be performed according to the shape of the encoding target block. Thereafter, partitioning and encoding for the first block E1 and the block E1 generated by the binary tree partitioning of the block D1 may be performed. The width of block E1 is equal to 2, which is assumed to be the minimum size of the sub-block. Therefore, the vertical partitioning may not be performed on the block E1. That is, the block E1 may be encoded without being partitioned, or may be horizontally partitioned and then encoded. In this case, for the block E1, only information on whether to perform partitioning may be signaled. Since the block E2 is not completely included in the area of the current image, partitioning and encoding may be omitted.

The partition information omission scheme of the largest block 2 and the largest block 5 shown in FIG. 11 may be the same. In addition, the partition information omission scheme of the largest block 6 and the largest block 7 may be the same as the partition information omission scheme of the largest block 2 and the largest block 5, except for a difference between the horizontal or vertical direction. For the largest block 8, partition information omission may be performed in the same manner as other largest blocks by using the reference preset horizontally or vertically.

Hereinafter, with reference to FIGS. 12a to 12e, description will be made on the partitioning of the largest block 2 and/or the decoding of the partition information of FIG. 11.

FIG. 12a is an enlarged view of the largest block 2, in which a portion surrounded by a thick line is an area in the current image. The largest block 2 may be the partition target block described with reference to FIG. 9. As shown in FIG. 12a, the rightmost position and the bottommost position of the largest block 2 are not completely included in the area of the current image. Also, the size of the largest block 2 is 64×64, which is a size in which quad tree partitioning is possible. In this case, the largest block 2 may be quad tree partitioned (S1003). That is, step S1001 for the largest block 2 may be omitted. Then, partitioning and decoding for the block A0, which is the first block among the four blocks A0, A1, A2, and A3 generated by the quad tree partitioning of the largest block 2, may be performed. Since the block A1 and the block A3 are not completely included in the area of the current image, partitioning and decoding may be omitted. The block A2 may be partitioned and decoded according to the present invention like the block A0.

FIG. 12b is an enlarged view of the block A0 in FIG. 12a, in which a portion surrounded by a thick line is an area in the current image. The block A0 may be the partition target block described with reference to FIG. 9. As shown in FIG. 12b, the rightmost position and the bottommost position of the block A0 are not completely included in the area of the current image. In addition, the size of the block A0 is 32×32, which is a size in which quad tree partitioning is possible. In this case, the block A0 may be quad tree partitioned (S1003). That is, step S1001 for block A0 may be omitted. Thereafter, partitioning and decoding of the first block, that is, block B0, among the four blocks B0, B1, B2, and B3 generated by the quad tree partitioning of the block A0 may be performed. The block B0 may be partitioned and decoded in the manner described with reference to FIG. 9. That is, the block B0 may be decoded without being partitioned or with being partitioned by quad tree partition and/or binary tree partition. The block B2 may be partitioned and decoded according to the present invention similarly as the block B0. Since block B1 and block B3 are not completely included in the area of the current image, partitioning and decoding may be omitted. The block B2 may be partitioned and decoded in the same manner as the block B0. That is, step S1001 may not be omitted for the block B0 and the block B2. However, for blocks B1 and B3, step S1001 may be omitted as will be described later.

FIG. 12c is an enlarged view of the block B1 in FIG. 12b, in which a portion surrounded by a thick line is an area in the current image. The block B1 may be the partition target block described with reference to FIG. 9. As shown in FIG. 12c, the rightmost position and the bottommost position of the block B1 are not completely included in the area of the current image. In addition, the size of the block B1 is 16×16, which is a size in which quad tree partitioning is impossible. In this case, the block B1 may not be quad tree partitioned, but may be binary tree partitioned. Also, since the decoding target block is a vertically long rectangle, the partition direction may be determined to be the vertical direction. Accordingly, steps S1001 to S1007 may be omitted for the block B1, and the binary tree partitioning of step S1009 or S1010 may be performed according to the shape of the decoding target block. Thereafter, partitioning and decoding may be performed on the block C1, which is the first block of the two blocks C1 and C2 generated by the binary tree partitioning of the block B1. Since the block C2 is not completely contained in the area of the current image, partitioning and decoding may be omitted.

FIG. 12d is an enlarged view of the block C1 of FIG. 12c, in which a portion surrounded by a thick line is an area in the current image. The block C1 may be the partition target block described with reference to FIG. 9. As shown in FIG. 12d, the rightmost position and the bottommost position of the block C1 are not completely included in the area of the current image. In addition, since the binary tree partition is applied to the upper level block B1 of the block C1, the block C1 may also be binary tree partitioned. Also, since the decoding target block is a vertically long rectangle, the partition direction may be determined to be the vertical direction. Therefore, steps S1005 to S1007 may be omitted for block C1, and the binary tree partition of step S1009 or S1010 may be performed according to the shape of the decoding target block. Thereafter, partitioning and decoding may be performed on block D1, which is the first block among the two blocks D1 and D2 generated by the binary tree partitioning of the block C1. Since the block D2 is not completely included in the area of the current image, partitioning and decoding may be omitted.

FIG. 12e is an enlarged view of the block D1 of FIG. 12d, in which a portion surrounded by a thick line is an area in the current image. The block D1 may be the partition target block described with reference to FIG. 9. As shown in FIG. 12e, the rightmost position and the bottommost position of the block D1 are not completely included in the area of the current image. In addition, since the binary tree partition is applied to the upper level block C1 of the block D1, the block D1 may also be binary tree partitioned. Also, since the decoding target block is a vertically long rectangle, the partition direction may be determined to be the vertical direction. Therefore, steps S1005 to S1007 may be omitted for the block D1, and the binary tree partitioning of step S1009 or S1010 may be performed according to the shape of the decoding target block. Thereafter, partitioning and decoding may be performed on the block E1, which is the first block among the two blocks E1 and E2 generated by the binary tree partitioning of the block D1. The width of block E1 is equal to 2, which is assumed to be the minimum size of the sub-block. Therefore, the vertical partition may not be performed for the block E1. That is, the block E1 may be decoded without being partitioned or may be horizontally partitioned and then decoded. In this case, for the block E1, only information on whether to perform partitioning may be signaled. Since the block E2 is not completely included in the area of the current image, partitioning and decoding may be omitted.

In the embodiment described with reference to FIG. 12, when quad tree partitioning is performed on a partition target block and a predetermined condition is satisfied, the binary tree partitioning may be performed. In the above embodiment, whether or not the size of the partition target block is a size in which quad tree partitioning is possible is corresponding to the predetermined condition. The predetermined condition may be set using minimum sizes of a block in which the quad tree partition is possible and a block in which the binary tree partition is possible and/or a threshold value.

When the threshold value is used, one of quad tree partitioning and binary tree partitioning is performed on the basis of a result of comparing the threshold value with a size of an area (hereinafter, referred to "remaining area") not completely included in the current image of the partition target block. In the following description, it is assumed that the threshold value is 32.

For example, in FIG. 12a, the size of the encoding target block is 18×64, and the size of the remaining area is 46×64. Since the remaining area is a vertically long rectangle, the horizontal length of the remaining area may be compared with the threshold value. The horizontal length of the remaining area is 46, which is larger than the threshold value of 32, so that quad tree partitioning may be performed on a 64×64 partition target block. In FIG. 12B, since the horizontal length of the remaining area is 14, which is smaller than the threshold value of 32, binary tree partitioning may be performed on a 32×32 partition target block. That is, even when the size of the partition target block is a size in which quad tree partitioning is possible, binary tree partitioning may be performed instead of quad tree partitioning according to the above conditions. In this case, the partition direction of the binary tree partitioning is based on the smaller one of the width and height of the 18×32 encoding target block. Thus, the block A0 in FIG. 12b may be partitioned into two vertically long 16×32 blocks. After this, the binary tree partitioning in the vertical direction may be repeatedly performed until the size of the block become a size in which binary tree partitioning is impossible.

The threshold value may be signaled through an upper level header of the above-mentioned block. The threshold value should be a value between a largest size and a minimum size of a block capable of quad tree partitioning. Also, the threshold value may be set to be smaller than a largest size of a block in which binary tree partitioning is possible. When the threshold value is set to be larger than the largest size of a block capable of binary tree partitioning, the threshold value may be changed to a largest size of a block capable of binary tree partitioning.

FIGS. 13a to 13e are views illustrating an image partition method according to another embodiment of the present invention.

Figure 13A:
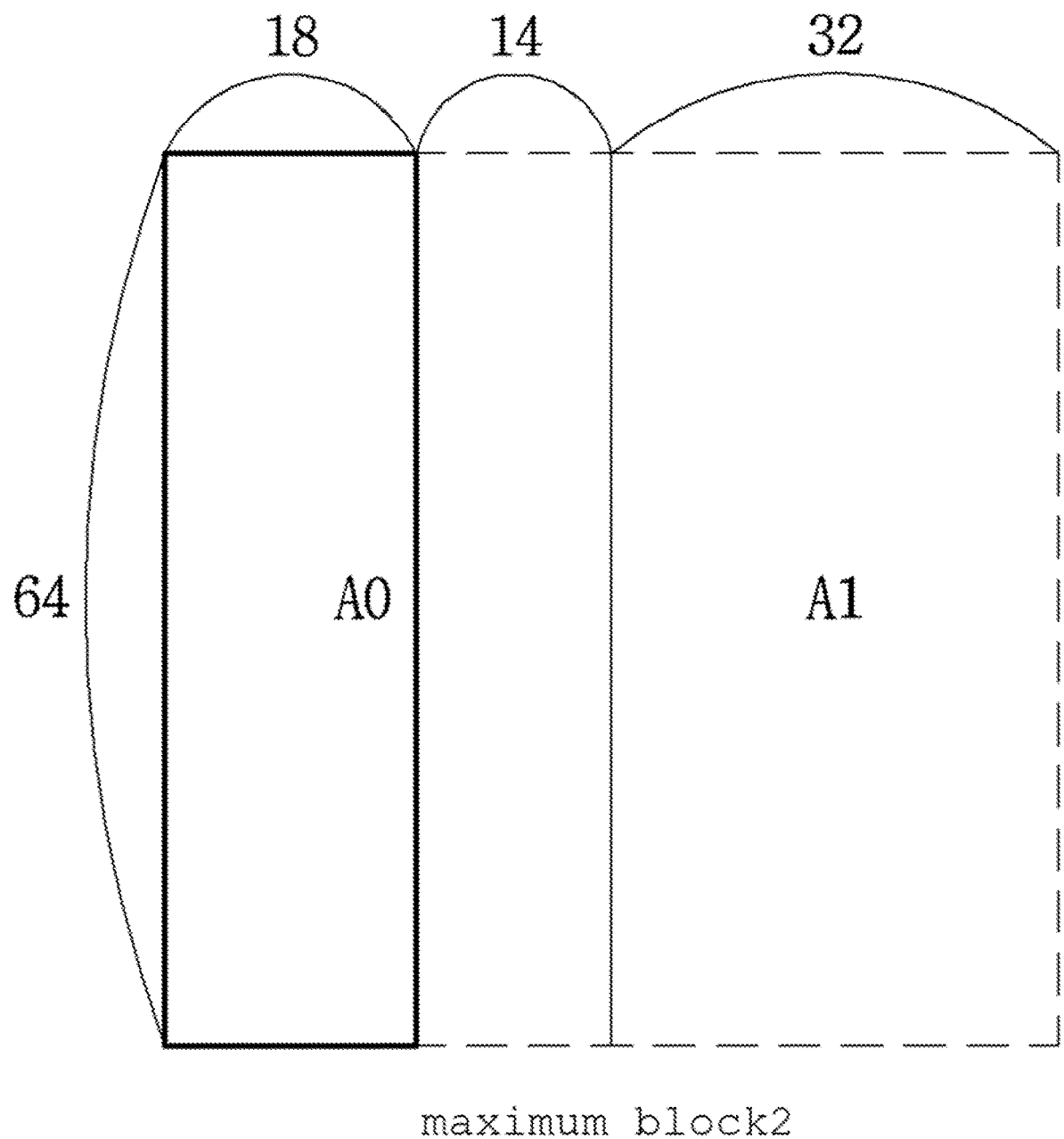
FIGS. 13a to 13e are diagrams illustrating an image partitioning method according to another embodiment of the present invention.

FIG. 13a is an enlarged view of the largest block 2, in which a portion surrounded by a thick line is an area in the current image. The largest block 2 may be the partition target block described with reference to FIG. 9. As shown in FIG. 13a, the rightmost position and the bottommost position of the largest block 2 are not completely included in the area of the current image. In this case, the block partition scheme may be selected on the basis of the type of the remaining area. Since the remaining area in FIG. 13a is a vertically long 46×64 block, it is possible to perform a binary tree partition in the vertical direction for the largest block 2. That is, steps S901 to S907 for the largest block 2 may be omitted, and step S909 or S910 may be performed depending on the type of the remaining area.

Figure 13B:
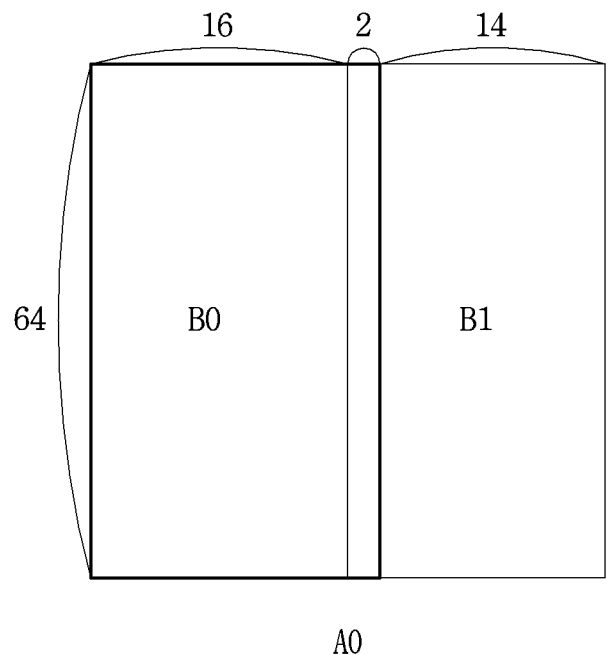

FIG. 13b is an enlarged view of block A0 in FIG. 13a, in which a portion surrounded by a thick line is an area in the current image. The block A0 may be the partition target block described with reference to FIG. 9. As shown in FIG. 13b, the rightmost position and the bottommost position of the block A0 are not completely contained in the area of the current image. In this case, the block partition scheme may be selected on the basis of the type of the remaining area. Since the remaining area in FIG. 13b is a vertically long 14×64 block, vertical binary tree partitioning may be performed on the block A0. The block B0 is a block in the current image area, so that the block B0 may be encoded using sub-block partitioning. Steps S905 to S908 may not be omitted for the block B0.

Figure 13C:
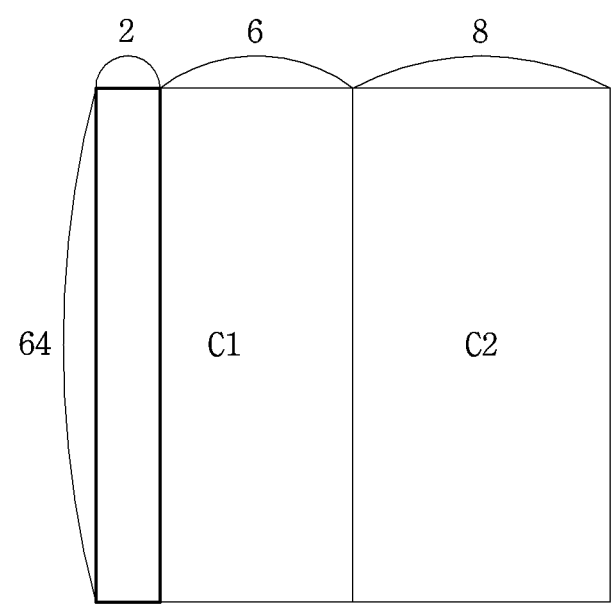

FIG. 13c is an enlarged view of the block B1 in FIG. 13b, in which a portion surrounded by a thick line is a region in the current image. The block B1 may be the partition target block described with reference to FIG. 9. As shown in FIG. 13c, the rightmost position and the bottommost position of the block B1 are not completely included in the area of the current image. In this case, the block partition scheme may be selected on the basis of the type of the remaining area. Since the remaining area in FIG. 13c is a vertically long 14×64 block, vertical binary tree partitioning may be performed on the block B1. That is, steps S901 to S907 for block B1 may be omitted, and step S909 or S910 may be performed depending on the type of the remaining area. Since the block C2 is not completely included in the area of the current image, partitioning and encoding may be omitted.

Figure 13D:
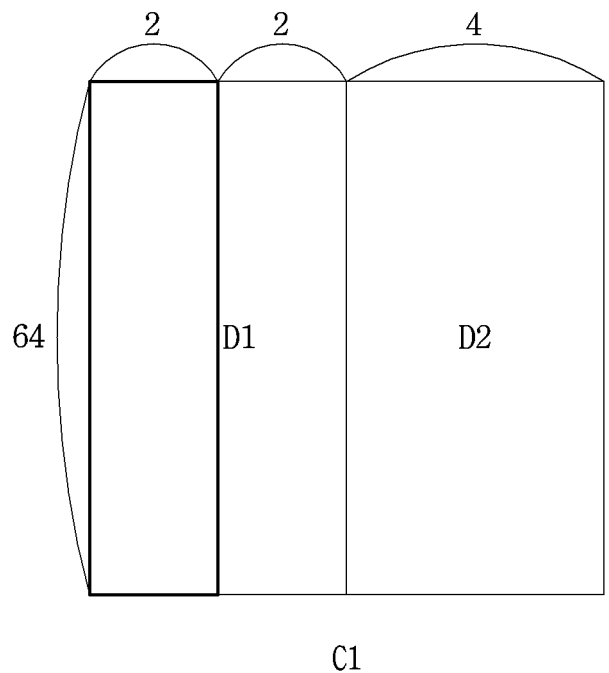

FIG. 13d is an enlarged view of the block C1 in FIG. 13c, in which a portion surrounded by a thick line is a region in the current image. The block C1 may be the partition target block described with reference to FIG. 9. As shown in FIG. 13d, the rightmost position and the bottommost position of the block C1 are not completely included in the area of the current image. In this case, the block partition scheme may be selected on the basis of the type of the remaining area. Since the remaining area in FIG. 13c is a vertically long 6×64 block, vertical binary tree partitioning may be performed on the block C1. That is, steps S901 to S907 for block C1 may be omitted, and step S909 or S910 may be performed depending on the type of the remaining area. Since the block D2 is not completely included in the area of the current image, partitioning and encoding may be omitted.

Figure 13E:
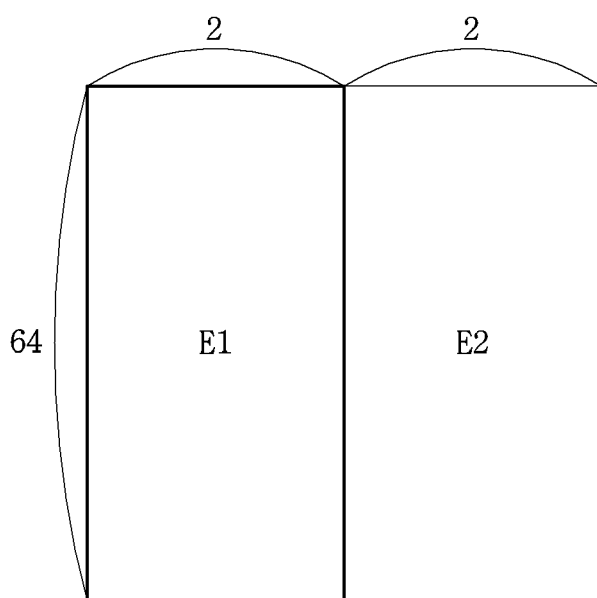

FIG. 13e is an enlarged view of the block D1 in FIG. 13d, in which a portion surrounded by a thick line is an area in the current image. The block D1 may be the partition target block described with reference to FIG. 9. As shown in FIG. 13e, the rightmost position and the bottommost position of the block D1 are not completely included in the area of the current image. In this case, the block partition scheme may be selected on the basis of the type of the remaining area. Since the remaining area in FIG. 13c is a vertically long 2×64 block, vertical binary tree partitioning may be performed on the block D1. That is, steps S901 to S907 for the block D1 may be omitted, and step S909 or S910 may be performed depending on the type of the remaining area. The width of the block E1 is equal to 2, which is assumed to be the minimum size of the sub-block. Therefore, the vertical partition may not be performed on the block E1. That is, the block E1 may be encoded without being partitioned or may be horizontally partitioned and then encoded. In this case, for the block E1, only information on whether to perform partitioning may be signaled. Since the block E2 is not completely included in the area of the current image, partitioning and encoding may be omitted.

Hereinafter, with reference to FIG. 13a to FIG. 13e, description will be made on the partition method and/or the partition information decoding of the largest block 2 in FIG. 11.

FIG. 13a is an enlarged view of the largest block 2, in which a portion surrounded by a thick line is an area in the current image. The largest block 2 may be the partition target block described with reference to FIG. 9. As shown in FIG. 13a, the rightmost position and the bottommost position of the largest block 2 are not completely included in the area of the current image. In this case, the block partition scheme may be selected on the basis of the type of the remaining area. Since the remaining area in FIG. 13a is a vertically long 46×64 block, it is possible to perform binary tree partitioning in the vertical direction on the largest block 2. That is, steps S1001 to S1007 for the largest block 2 may be omitted, and step S1009 or S1010 may be performed depending on the type of the remaining area.

FIG. 13b is an enlarged view of the block A0 in FIG. 13a, in which a portion surrounded by a thick line is an area in the current image. The block A0 may be the partition target block described with reference to FIG. 9. As shown in FIG. 13b, the rightmost position and the bottommost position of the block A0 are not completely included in the area of the current image. In this case, the block partition scheme may be selected on the basis of the type of the remaining area. Since the remaining area in FIG. 13b is a vertically long 14×64 block, vertical binary tree partitioning may be performed on the block A0. Since the block B0 is a block in the current image area, the block B0 may be decoded using sub-block partitioning. Steps S1005 to S1008 may not be omitted for the block B0.

FIG. 13c is an enlarged view of the block B1 in FIG. 13b, in which a portion surrounded by a thick line is a region in the current image. The block B1 may be the partition target block described with reference to FIG. 9. As shown in FIG. 13c, the rightmost position and the bottommost position of the block B1 are not completely included in the area of the current image. In this case, the block partition scheme may be selected on the basis of the type of the remaining area. Since the remaining area in FIG. 13c is a vertically long 14×64 block, vertical binary tree partitioning may be performed on the block B1. That is, steps S1001 to S1007 for block B1 may be omitted, and step S1009 or S1010 may be performed depending on the type of the remaining area. Since the block C2 is not completely included in the area of the current image, partitioning and decoding may be omitted.

FIG. 13d is an enlarged view of the block C1 in FIG. 13c, in which a portion surrounded by a thick line is a region in the current image. The block C1 may be the partition target block described with reference to FIG. 9. As shown in FIG. 13d, the rightmost position and the bottommost position of the block C1 are not completely included in the area of the current image. In this case, the block partition scheme may be selected on the basis of the type of the remaining area. Since the remaining area in FIG. 13c is a vertically long 6×64 block, a vertical binary tree partition may be performed on the block C1. That is, steps S1001 to S1007 for the block C1 may be omitted, and step S1009 or S1010 may be performed depending on the type of the remaining area. Since the block D2 is not completely included in the area of the current image, partitioning and decoding may be omitted.

FIG. 13e is an enlarged view of the block D1 in FIG. 13d, in which a portion surrounded by a thick line is a region in the current image. The block D1 may be the partition target block described with reference to FIG. 9. As shown in FIG. 13e, the rightmost position and the bottommost position of the block D1 are not completely included in the area of the current image. In this case, the block partition scheme may be selected on the basis of the type of the remaining area. Since the remaining area in FIG. 13c is a vertically long 2×64 block, vertical binary tree partitioning may be performed on the block D1. That is, steps S1001 to S1007 for block D1 may be omitted, and step S1009 or S1010 may be performed depending on the type of the remaining area. The width of block E1 is equal to 2, which is assumed to be the minimum size of the sub-block. Therefore, the vertical partition may not be performed for the block E1. That is, the block E1 may be decoded without being partitioned or horizontally partitioned and then decoded. In this case, for the block E1, only information on whether to perform partitioning may be signaled. Since block E2 is not completely included in the area of the current image, partitioning and decoding may be omitted.

In the embodiment described with reference to FIG. 13, only the binary tree partitioning is performed for the partition target block, and the direction of the binary tree partition may be determined according to the shape of the remaining area.

In the embodiment described with reference to FIGS. 9 and 10, it is possible to perform partition processing on a boundary of an image in units of sub-blocks or blocks. Information on whether to perform partition processing on the boundary of the image in a certain unit may be signaled. For example, the information may be signaled from the encoder to the decoder through an upper level header of the block described above.

As described above, for inter prediction of the current block, a skip mode, merge mode, AMVP mode, or the like may be used.

In the skip mode, the optimal prediction information of the current block is determined using the motion information of the area that has been already reconstructed. Specifically, the image encoding apparatus constructs a motion information candidate group within the reconstructed area, and generates the prediction block of the current block by using a candidate having the smallest RD cost among the candidate groups as prediction information. A method of constructing the motion information candidate group will be described later with reference to FIG. 14.

In the merge mode, the optimal prediction information of the current block is determined using the motion information of the area that has been already reconstructed, which is the same as in the skip mode. However, in the case of the skip mode, the motion information is searched from the motion information candidate group so that the prediction error is zero, whereas in the merge mode, the prediction error may not be zero. As in the case of the skip mode, the image encoding apparatus constructs a motion information candidate group in the reconstructed area and generates a prediction block of the current block using the candidate having the smallest RD cost among the candidate groups as the prediction information.

Figure 14:
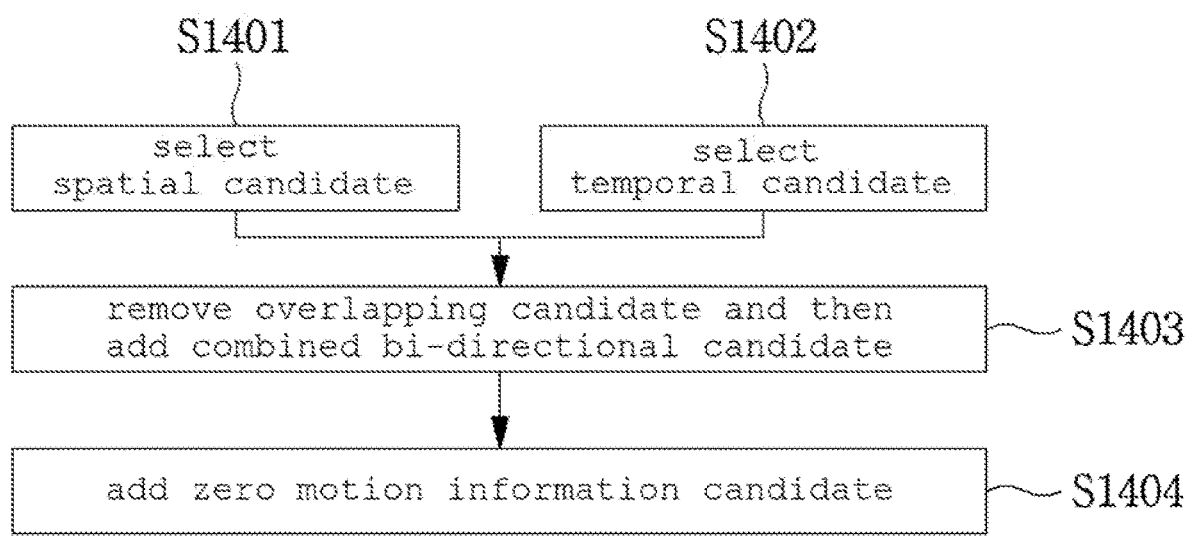
FIG. 14 is a view illustrating a method of generating a motion information candidate group in the case of a skip mode and a merge mode.

FIG. 14 is a view illustrating a method of generating a motion information candidate group in the case of a skip mode and a merge mode.

The motion information candidate group may include at most N candidates. N may be a predetermined positive integer in the image encoding apparatus and the image decoding apparatus. Alternatively, information on N may be signaled via the bitstream. For example, information on N may be signaled through an upper level header of the block. The upper level of the block may be at least one of a video, a sequence, a picture, a slice, a tile, a coding tree unit (CTU), or a largest coding unit (LCU). Alternatively, N may be variably determined on the basis of on the size and/or shape of the current block. In the following embodiments described with reference to FIG. 14, N is assumed to be 5.

In step S1401, a spatial candidate may be selected. A spatial candidate may refer to a spatial candidate block in the picture to which the current block belongs or motion information of the spatial candidate block. Up to four spatial candidates may be selected from the five spatial candidate blocks in the current picture. When the spatial candidate block does not include motion information, for example, when the spatial candidate block is intra-predicted or PCM-encoded, the spatial candidate block may not be selected as a spatial candidate of the current block. Also, spatial candidates may be selected such that the motion information does not overlap.

Figure 16:
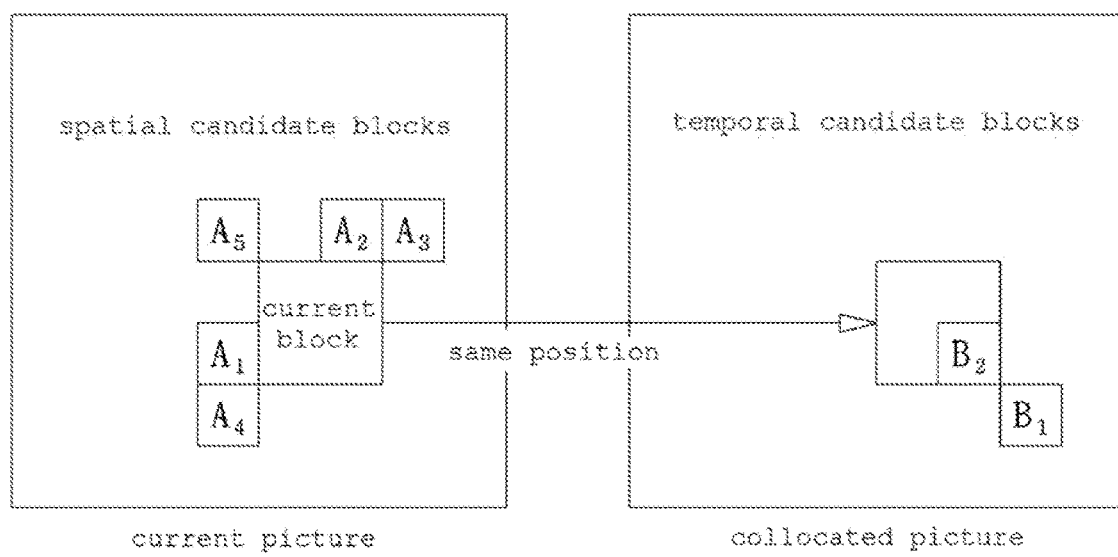
FIG. 16 is a view illustrating positions of spatial candidate blocks and temporal candidate blocks in the current block.

FIG. 16 is a view illustrating positions of spatial candidate blocks and temporal candidate blocks in the current block.

In the example shown in FIG. 16, the spatial candidate block may include at least one of the blocks A1, A2, A3, A4, and A5. In addition to the spatial candidate blocks shown in FIG. 16, an arbitrary block in the reconstructed region of the current picture may be used as a spatial candidate block. When selecting spatial candidates from spatial candidate blocks, blocks A1, A2, A3, A4, and A5 may be considered in this order. According to the priority, an available spatial candidate block or motion information thereof may be selected as a spatial candidate. When the motion information of the available spatial candidate blocks is not overlapped, the spatial candidate block with the lowest priority may not be considered.

In step S1402, a temporal candidate may be selected. The temporal candidate may refer to a temporal candidate block in a picture other than the picture to which the current block belongs (e.g., collocated picture) or motion information of the temporal candidate block. One temporal candidate may be selected from two temporal candidate blocks in the collocated picture. When the temporal candidate block does not include motion information, for example, when the temporal candidate block is intra-predicted or PCM-encoded, the temporal candidate block may not be selected as the temporal candidate of the current block.

As shown in FIG. 16, the positions of the temporal candidate blocks may be determined on the basis of the position of the current block. That is, the temporal candidate blocks may be determined on the basis of the block in the collocated picture at the same position as the current block in the current picture. The collocated picture may be one of a reconstructed picture or a reference picture. The collocated picture may be selected in the image encoding apparatus and the image decoding apparatus in a predetermined manner. For example, a reference picture of any location (e.g., first location) in the reference picture list may be selected as the collocated picture. Alternatively, information on the selection of the collocated picture may be signaled.

The temporal candidate block may be a block in a collocated picture or a neighboring block thereof, which includes a sample at the same position as an arbitrary position in the current block. An arbitrary position in the current block may be the upper left pixel position, the center pixel position, or the lower right pixel position of the current block. In the example shown in FIG. 16, the temporal candidate blocks in the collocated picture may be blocks B1 and B2. When a temporal candidate is selected from the temporal candidate blocks, for example, blocks B1 and B2 may be considered in this order. Considering the blocks B1 and B2 according to the above order, when a temporal candidate block having higher priority is available as a temporal candidate, a temporal candidate block having lower priority may not be considered.

Figure 17:
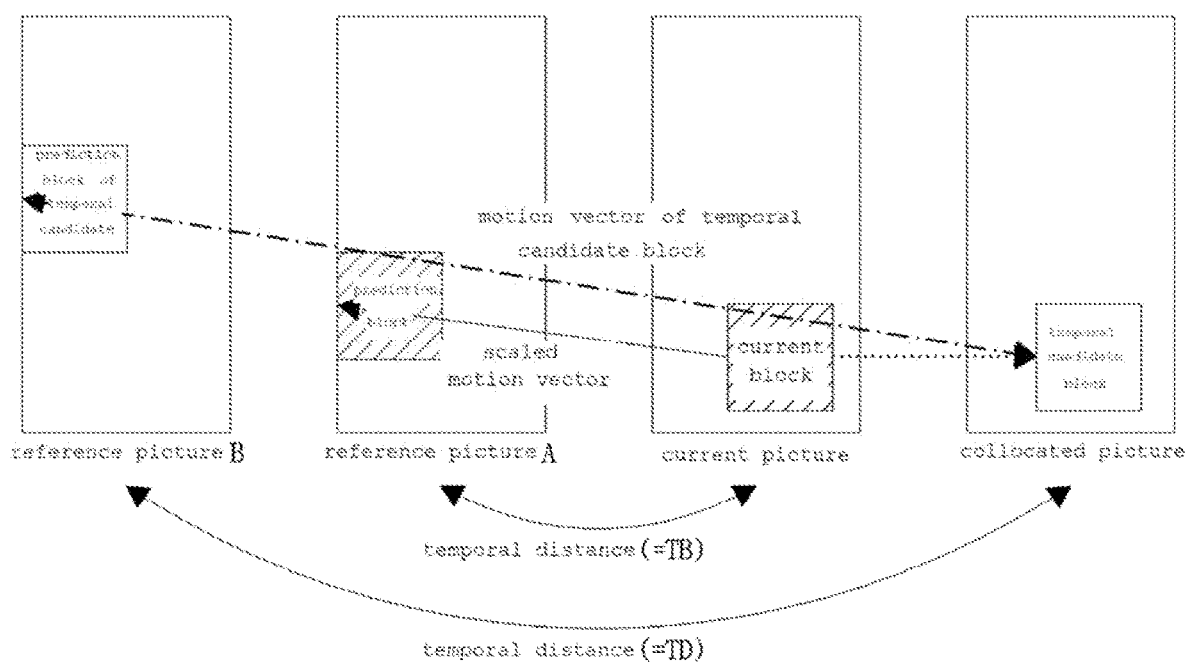
FIG. 17 is a view illustrating a method of determining motion information of a temporal candidate.

FIG. 17 is a view illustrating a method of determining motion information of a temporal candidate.

The motion information of the temporal candidate block in the collocated picture may indicate a prediction block in the reference picture B. Each of the temporal candidate blocks may refer to a different reference picture. In the following description, the reference picture of the temporal candidate block is referred to as a reference picture B for convenience. The motion vector of the temporal candidate block may be scaled considering TB and TD in FIG. 17. TB denotes the distance between the current picture and the reference picture A, and TD denotes the distance between the collocated picture and the reference picture B. The motion vector of the scaled temporal candidate may be used as the motion information of the temporal candidate of the current block. Equation 2 below may be used for the scaling.

$$MV_{scale} = \left(\left(\left(TB \times \frac{2^{14} + (TD \gg 1)}{TD} + 2^5\right) \gg 6\right) \times MV + (2^7 - 1)\right) \gg 2^3$$ [Equation 2]

In Equation 2, MV indicates a motion vector of the temporal candidate block, and MVscale indicates a scaled motion vector. Also, the reference picture A and the reference picture B may be the same reference picture. The scaled motion vector MVscale may be determined as a motion vector of the temporal candidate. Also, the reference picture information of the temporal candidate may be determined as the reference picture of the current picture.

Step S1403 may be performed when the sum of the spatial candidates and the temporal candidates derived in steps S1401 and S1402 is less than N. In step S1403, candidates derived in the previous step may be combined to add a new bidirectional motion information candidate to the motion information candidate group. The bidirectional motion information candidates are referred to as candidates combined and newly generated by fetching the past and future motion information derived from the previous step one by one.

FIG. 18 is an exemplary table illustrating a priority of a combination capable of being used to generate bidirectional motion information candidates. For example, the combination of the candidate index (past) 0 and the candidate index (future) 1 may be first considered first according to the priority shown in FIG. 18. The combination of the priority and index shown in FIG. 18 is illustrative, but the present invention is not limited thereto. For example, an additional combination other than the combination shown in FIG. 18 is possible, or change of the priority is possible.

In step S1403, when the bidirectional motion information candidate is added but the total number of motion information candidates is less than N, step S1404 may be performed. In step S1404, the motion vector is a zero motion vector, and a new motion information candidate having different reference picture according to the prediction direction may be added to the motion information candidate group.

In the case of AMVP mode, optimal motion information may be determined by performing motion estimation for each reference picture according to a prediction direction. The prediction direction may be unidirectional using only one of the past/future directions, or both directions using both the past and future directions. A prediction block may be generated by performing motion compensation using optimal motion information determined through motion prediction. Here, a motion information candidate group for motion estimation may be derived for each reference picture according to the prediction direction. The motion information candidate group may be used as a starting point of motion estimation.

In the present specification, the prediction direction is described as the past direction and the future direction, but the present invention is not limited thereto. For example, it may be expressed as forward and backward or in a first direction and a second direction. For example, when N reference picture lists are used for a current block, prediction directions corresponding to the number of reference picture lists may exist. In this case, the prediction direction may be expressed in the first direction to the Nth direction. The N may be an integer of 2 or more.

Figure 15:
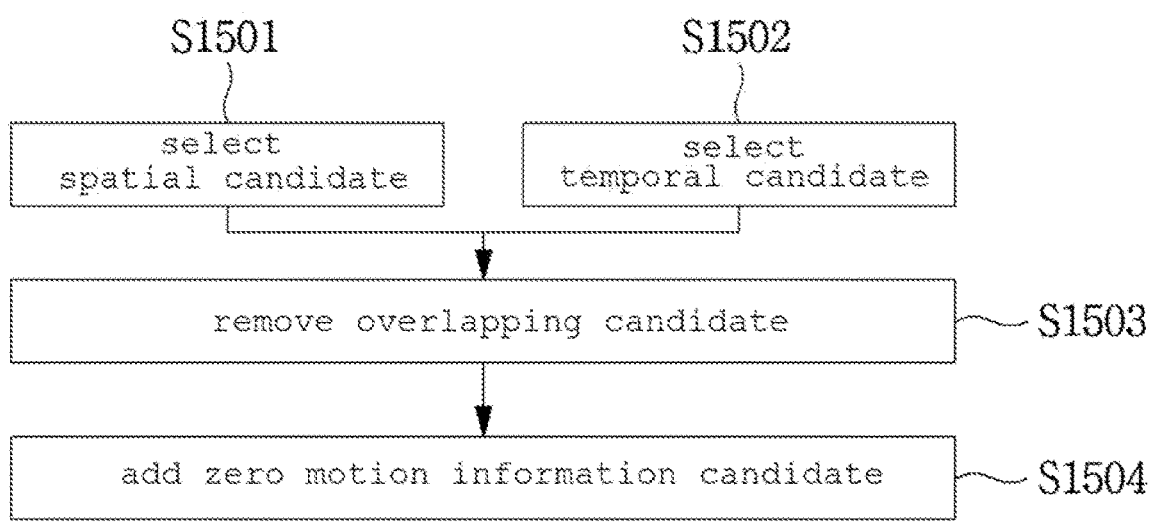
FIG. 15 is a view illustrating a method of deriving a motion information candidate group for motion estimation in an AMVP mode.

FIG. 15 is a view illustrating a method of deriving a motion information candidate group for motion estimation in an AMVP mode.

Similar to the case described with reference to FIG. 15, the largest number of candidates that may be included in the motion information candidate group may be determined equally in the image encoding apparatus and the image decoding apparatus, or may be signaled through the upper level header of the block, and may be variably determined on the basis of the size and/or shape of the current block.

In steps S1501 and S1502, a spatial candidate and a temporal candidate is selected. Each of steps S1501 and S1502 may be performed similarly to steps S1401 and S1402 in FIG. 14. However, unlike in step S1401, in step S1501, the number of selected spatial candidates may be changed. For example, in step S1501, two spatial candidates may be selected. In addition, the priority among spatial candidate blocks for selecting a spatial candidate may also be different.

In step S1503, when there is overlapped motion information among the candidates derived up to now, it may be removed. Step S1504 may be performed similarly to step S1404. When the motion information candidates are derived, the motion information candidate having minimum RD cost may be selected as the optimal motion information candidate. By performing motion estimation on the basis of the selected motion information, optimal motion information of the AMVP mode may be derived.

The intra prediction mode for performing intra prediction described above may include a DC mode, a planar mode, and N directional modes. The N directional mode is a mode for generating a prediction block of the current block by partitioning the reconstructed pixels around the current block into N directions and mapping neighboring pixels to the predicted pixel for each direction. Once the optimal intra prediction mode is determined, an MPM candidate list may be generated to encode the same.

FIG. 19 is a view illustrating generation of an MPM candidate list.

The number of MPM candidate lists may be determined to be P (P is a positive integer). The method of determining the MPM candidate is not limited to the method described with reference to FIG. 19. In FIG. 19, L is the intra prediction mode information of the neighboring block located on the left side of the current block, and A is the intra prediction mode information of the neighboring block located on the top of the current block. According to each condition shown in FIG. 19, an MPM candidate list including three MPM candidates may be generated.

Figure 20:
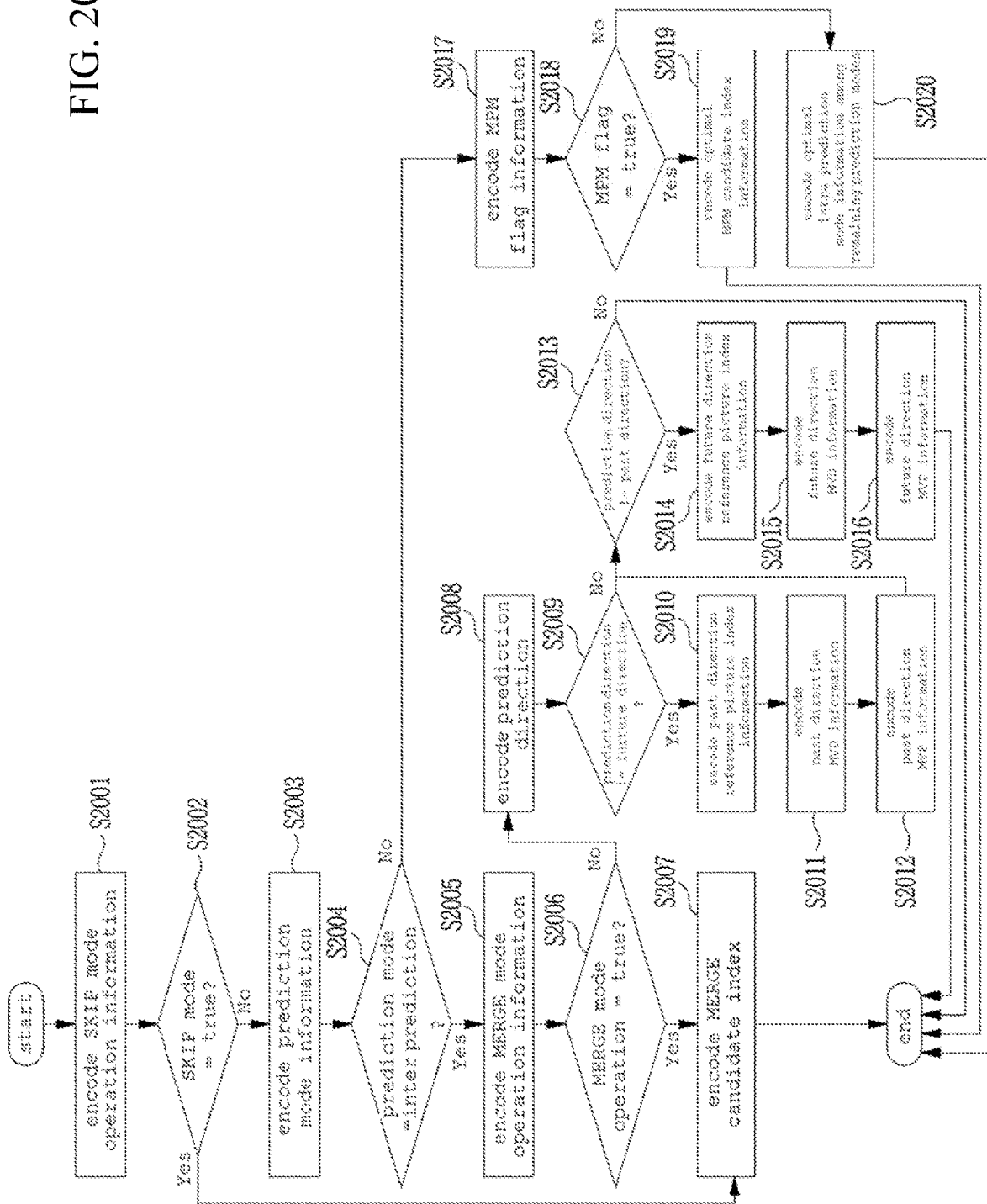
FIG. 20 is a view illustrating a method of encoding the optimal prediction information of skip mode, merge mode, AMVP mode, and intra prediction mode.

FIG. 20 is a view illustrating a method of encoding the optimal prediction information of skip mode, merge mode, AMVP mode, and intra prediction mode.

In step S2001, skip mode operation information may be encoded. The skip mode operation information may be information indicating whether or not the skip mode is applied to the current block. In step S2002, on the basis of the skip mode operation information, it may be determined whether or not it is a skip mode. In the case of the skip mode (Yes in step S2002), the process proceeds to step S2007 so that the merge candidate index is encoded, and the process is ended.

When it is not the skip mode (No in step S2002), prediction mode information may be encoded in step S2003. The prediction mode information may be information indicating whether inter prediction or intra prediction is performed for the current block. In step S2004, it may be determined whether the prediction mode for the current block is the inter prediction mode or the intra prediction mode on the basis of the prediction mode information. When the prediction mode of the current block is the inter prediction mode (Yes in step S2004), the process proceeds to step S2005. When the prediction mode of the current block is intra prediction mode (No in step S2004), the process proceeds to step S2017.

In step S2005, the merge mode operation information may be encoded. The merge mode operation information may be information indicating whether the merge mode is applied to the current block. In step S2006, it may be determined whether or not the merge mode is applied to the current block on the basis of the merge mode operation information. When the merge mode is applied to the current block (Yes in step S2006), the merge candidate index may be encoded in step S2007, and the process is ended.

When the merge mode is not applied to the current block in step S2006, the process proceeds to step S2008. In step S2008, whether the prediction direction is past, future, or bi-directional may be encoded. In step S2009, when the prediction direction is not the future direction, step S2010 may be performed. When the prediction direction is the future direction, step S2013 may be performed.

The reference picture index information in the past direction in step S2010, motion vector difference (MVD) information in the past direction in step S2011, and motion vector predictor (MVP) information in the past direction in step S2012 are encoded in this order. Here, MVD may mean a difference vector between the optimal motion vector of the prediction block and candidate motion vector optimally determined of the AMVP candidate list. Also, the MVP information may indicate index information of the AMVP candidate motion information that is determined to be optimum.

In step S2013, it is determined whether the prediction direction is the past direction, and when the direction is the past direction, the process of FIG. 20 may be ended. In step S2013, when the prediction direction is not the past direction, step S2014 may be performed. Reference picture index information in the future direction in step S2014, future direction MVD information in step S2015, and future direction MVP information in step S2016 may be encoded in this order.

When the intra prediction is applied to the current block (No in step S2004), MPM flag information may be encoded in step S2017. The MPM flag information may be information indicating whether the optimal intra prediction mode of the current block belongs to the MPM candidate list. In step S2018, it may be determined whether or not the MPM flag information is true. When the MPM flag information is true (Yes in step S2018), step S2019 may be performed. In step S2019, it is possible to encode index information indicating to which candidate the optimal intra prediction mode is identical out of the MPM candidate lists.

In step S2018, when the MPM flag information is false, step S2020 may be performed. In step S2020, it is possible to encode information indicating which intra prediction mode is the optimal intra prediction mode out of the remaining intra prediction modes except the intra prediction modes belonging to the MPM candidate list.

Figure 21:
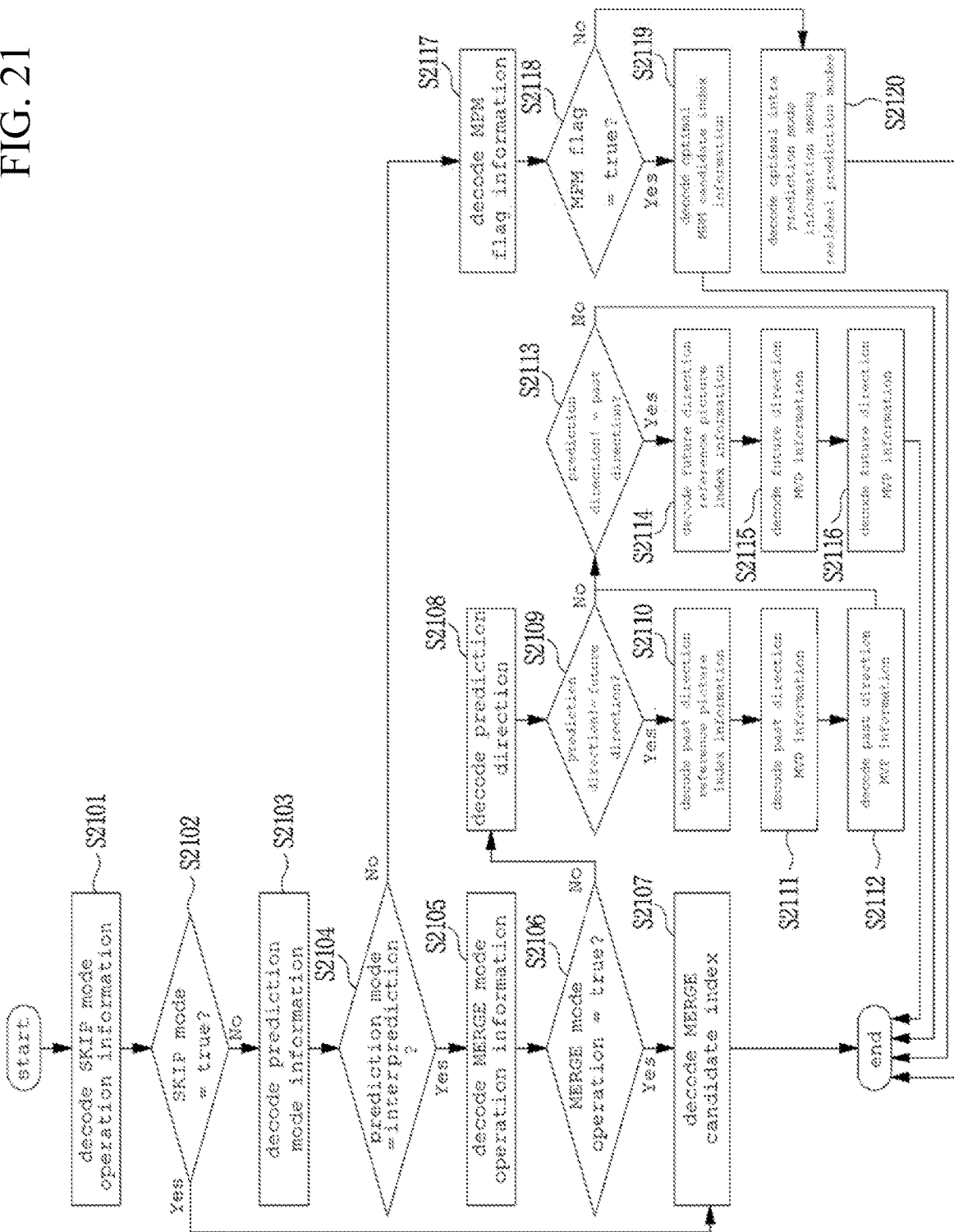
FIG. 21 is a view illustrating a method of decoding optimal prediction information.

FIG. 21 is a view illustrating a method of decoding optimal prediction information.

In step S2101, the skip mode operation information may be decoded. In step S2102, on the basis of the skip mode operation information, it may be determined whether or not it is a skip mode. In the case of skip mode (Yes in step S2102), the process proceeds to step S2107 so that the merge candidate index is decoded, and the process is ended.

In the case of not a skip mode (No in step S2102), prediction mode information may be decoded in step S2103. In step S2104, it may be determined whether the prediction mode for the current block is the inter prediction mode or the intra prediction mode on the basis of the prediction mode information. When the prediction mode of the current block is the inter prediction mode (Yes in step S2104), the process proceeds to step S2105. When the prediction mode of the current block is intra prediction mode (No in step S2104), the process proceeds to step S2117.

In step S2105, the merge mode operation information may be decoded. In step S2106, on the basis of the merge mode operation information, it may be determined whether or not the merge mode is applied to the current block. When the merge mode is applied to the current block (Yes in step S2106), the merge candidate index may be decoded in step S2107, and the process is ended.

When the merge mode is not applied to the current block in step S2106, the process may proceed to step S2108. In step S2108, it is possible to decode whether the prediction direction is past, future, or bi-directional. In step S2109, when the prediction direction is not the future direction, step S2110 may be performed. When the prediction direction is the future direction, step S2113 may be performed.

Reference picture index information in the past direction in step S2110, MVD information in the past direction in step S2111, and MVP information in the past direction are decoded in this order.

In step S2113, it is determined whether the prediction direction is the past direction, and when the direction is the past direction, the process of FIG. 21 may be ended. In step S2113, when the prediction direction is not the past direction, step S2114 may be performed. In step S2114, reference picture index information in the future direction, future direction MVD information in step S2115, and future direction MVP information in step S2116 may be decoded in this order.

When intra prediction is applied to the current block (No in step S2104), MPM flag information may be decoded in step S2117. In step S2118, it may be determined whether or not the MPM flag information is true. When the MPM flag information is true (Yes in step S2118), step S2119 may be performed. In step S2119, it is possible to decode index information indicating to which candidate the optimal intra prediction mode is identical out of the MPM candidate lists.

In step S2118, when the MPM flag information is false, step S2120 may be performed. In step S2120, it is possible to decode information indicating which intra prediction mode is the optimal intra prediction mode out of the remaining intra prediction modes except the intra prediction modes belonging to the MPM candidate list.

Hereinafter, various embodiments in which prediction information of a neighboring block of a current block is used for encoding/decoding prediction information to generate prediction block will be described.

When a block is partitioned by binary tree partitioning, the prediction information of specific blocks around the current block may not be utilized. That is, when constructing MPM candidate list in the case of intra prediction, or when deriving skip, merge or AMVP spatial candidates in the case of inter prediction, considering the partition structure of the block, some of neighboring blocks of the current block neighboring blocks may be excluded from the candidate. Hereinafter, the candidate list including the intra prediction MPM candidate list or the inter prediction spatial candidate is referred to as a "reference candidate list".

Figure 22:
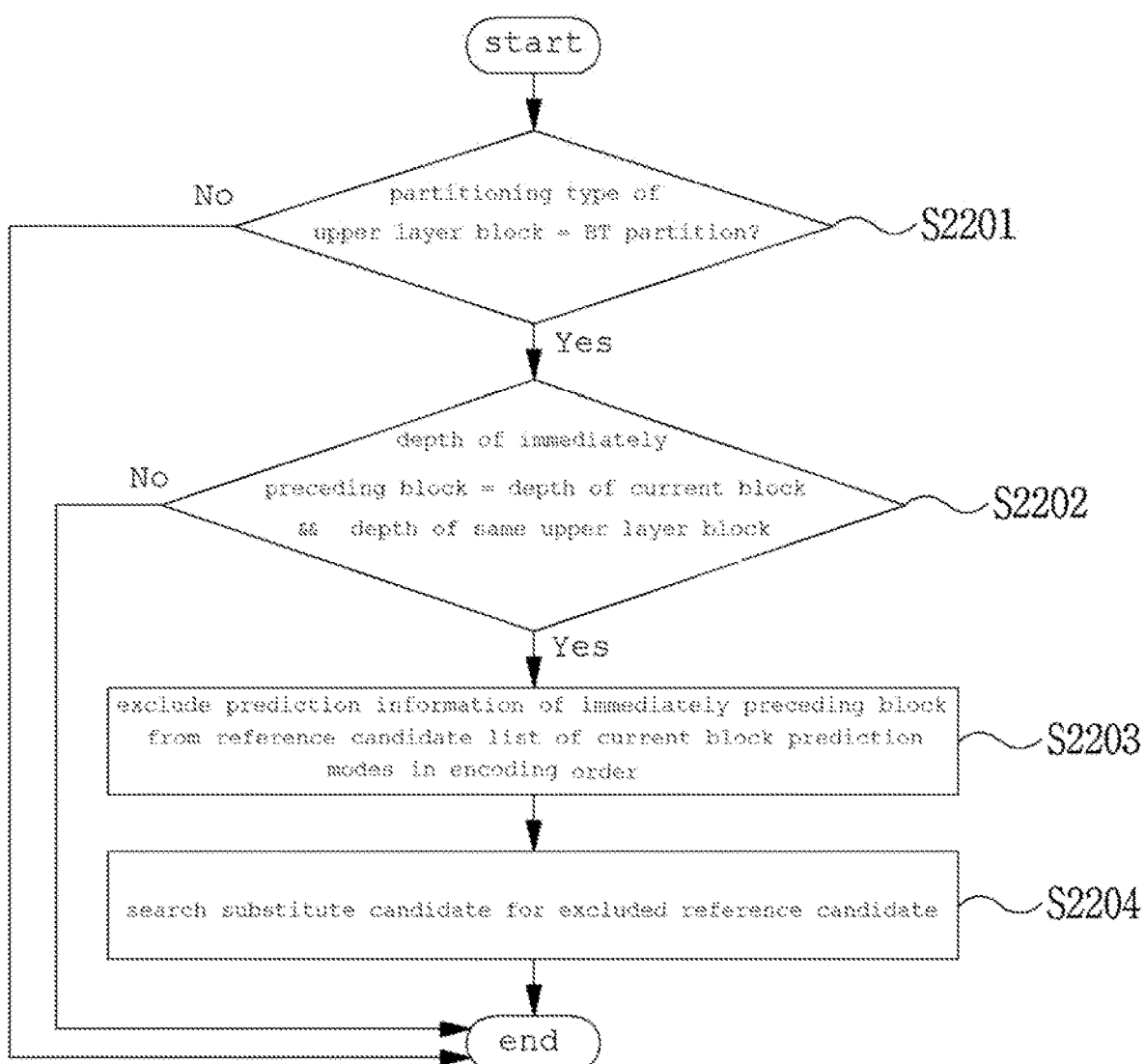
FIG. 22 is a view illustrating an embodiment of constructing a reference candidate list using neighboring blocks of the current block.

FIG. 22 is a view illustrating an embodiment of constructing a reference candidate list using neighboring blocks of the current block.

In step S2201, whether the partition type of the upper level block of the current block is a binary tree partition may be determined. That is, in step S2201, whether the current block is a block generated by the binary tree partition may be determined. When the partition type of the upper level block is not a binary tree partition, it is determined that there are no neighboring blocks that are excluded in the constructing of the reference candidate list, and the process of FIG. 22 may be ended. When the partition type of the upper level block is a binary tree partition, that is, when the current block is a block generated by binary tree partitioning, step S2202 may be performed.

In step S2202, it may be determined whether or not the depth of the current block and the depth of the immediately preceding block are the same, and whether the current block and the upper level block of the immediately preceding block are the same. The immediately preceding block means a block in which encoding/decoding is completed immediately before the current block in the coding order. The upper level block means a block before being partitioned into the current block or the immediately preceding block. Conversely, a lower level block may refer to a block generated by partitioning a current block. When the depth of the current block is different from the depth of the immediately preceding block and/or when an upper level block of the current block is different from an upper level block of the immediately preceding block, the processing of FIG. 22 may be ended. That is, in the case of No in step S2202, available neighboring blocks may be added as a candidate to the reference candidate list without neighboring blocks excluded according to the present embodiment when constructing the reference candidate list.

In step S2202, when the current block and the immediately preceding block have the same partition depth, and an upper level block of the current block and an upper level block of the previous block are the same to each other, the immediately preceding block is not included as a candidate in the reference block list of the current block or excluded from the reference candidate list (step S2203). When the upper level block is partitioned by binary tree partitioning into the current block and the immediately preceding block, there is a high likelihood that the current block and the immediately preceding block are the same to each other. In this case, there is a low likelihood that the prediction information of the immediately preceding block is used as the prediction information of the current block. Therefore, even the neighboring block of the current block is excluded from the candidate block of the current block, and accordingly the prediction efficiency and the compression ratio may be improved.

In step S2203, when the immediately preceding block is not included in the reference candidate list, a replacement candidate for replacing the reference candidate excluded in step S2204 may be additionally searched.

FIG. 23 is a view illustrating an example of constructing a reference candidate list of a current block on the basis of a partition type of a block.

In the example shown in (a) of FIG. 23, when the current block is a block 4, the immediately preceding block is a block 3 in the encoding order. In addition, the current block and the upper level block of the immediately preceding block are blocks including the blocks 3 and 4. The upper level block including the blocks 3 and 4 is partitioned by horizontal binary tree partitioning, so that the determination result of step S2201 is Yes. In addition, since the partition depths of the blocks 3 and 4 are the same, and the depth of the upper level block is also the same, the determination result of step S2202 is Yes. Therefore, in accordance with step S2203, the block 3, which is the immediately preceding block, is not included in the reference candidate list of the current block.

Similarly, in the example shown in (a) of FIG. 23, when the current block is block 7, block 6, which is the immediately preceding block of the current block, is excluded from the reference candidate list of the current block. In addition, in the example shown in (b) of FIG. 23, when the current block is a block 11, the prediction information of a block 10, which is the immediately preceding block, is not considered as a reference block of the current block.

As described with reference to the example shown in (a) and (b) of FIG. 23, when the immediately preceding block of the current block is not considered as a reference candidate, another candidate may be searched to substitute the prediction information of a neighboring block excluded from the reference candidate list (S2204). The substitute candidate may be determined by various methods. For example, prediction information of a block that is not adjacent to a current block may be used among blocks partitioned from a block of an upper level depth of the current block. For example, in the example shown in (a) of FIG. 23, when the current block is a block 4, a block of an upper level depth of the block 4 may be a combination of the blocks 2, 3, and 4. In this case, since the block 2 is a block partitioned from a block of an upper level depth without being adjacent to the block 4, the prediction information of the block 2 instead of the prediction information of the block 3 may be added to the reference candidate list of the block 4. As another example for determining a replacement candidate, arbitrary prediction information determined in an upper level header (video, sequence, picture, slice, tile, CTU, etc.) may be used instead of the prediction information of neighboring blocks excluded from the reference candidate list. For example, when the current block is predicted in intra prediction mode, the arbitrary prediction information may be a predetermined intra prediction mode (for example, planar mode or DC mode). For example, when the current block is predicted in the inter prediction mode, the arbitrary prediction information may be predetermined prediction information (e.g., {(0,0) motion vector, reference picture index 0, past direction). Alternatively, step S2204 may not be performed and the alternative candidate may not be searched.

Even when the current block is a block generated by quad tree partitioning, prediction information of specific blocks around the current block may not be utilized.

Figure 24:
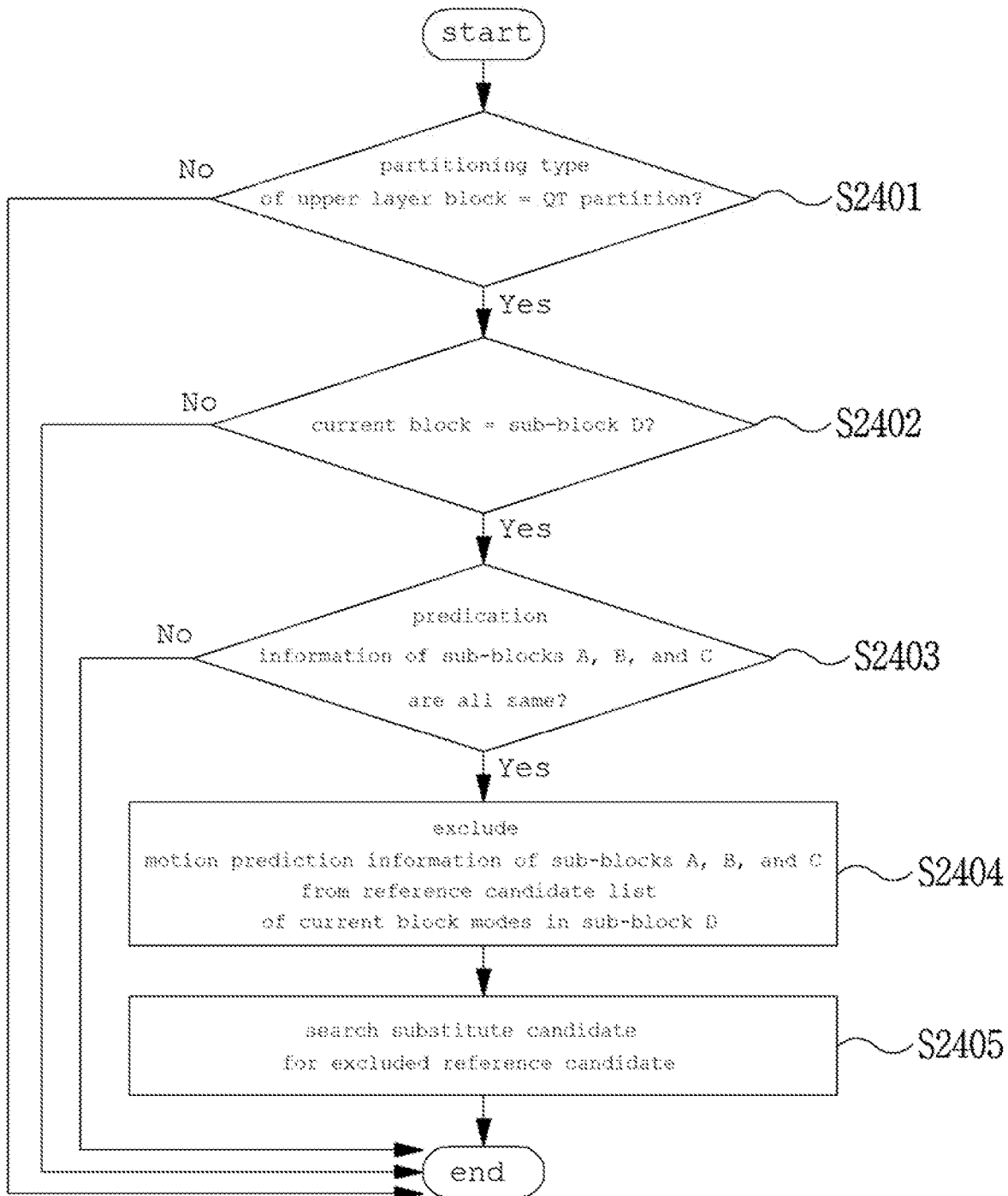
FIG. 24 is a view illustrating another embodiment for constructing a reference candidate list using neighboring blocks of the current block.

FIG. 24 is a view illustrating another embodiment for constructing a reference candidate list using neighboring blocks of the current block.

Figure 25:
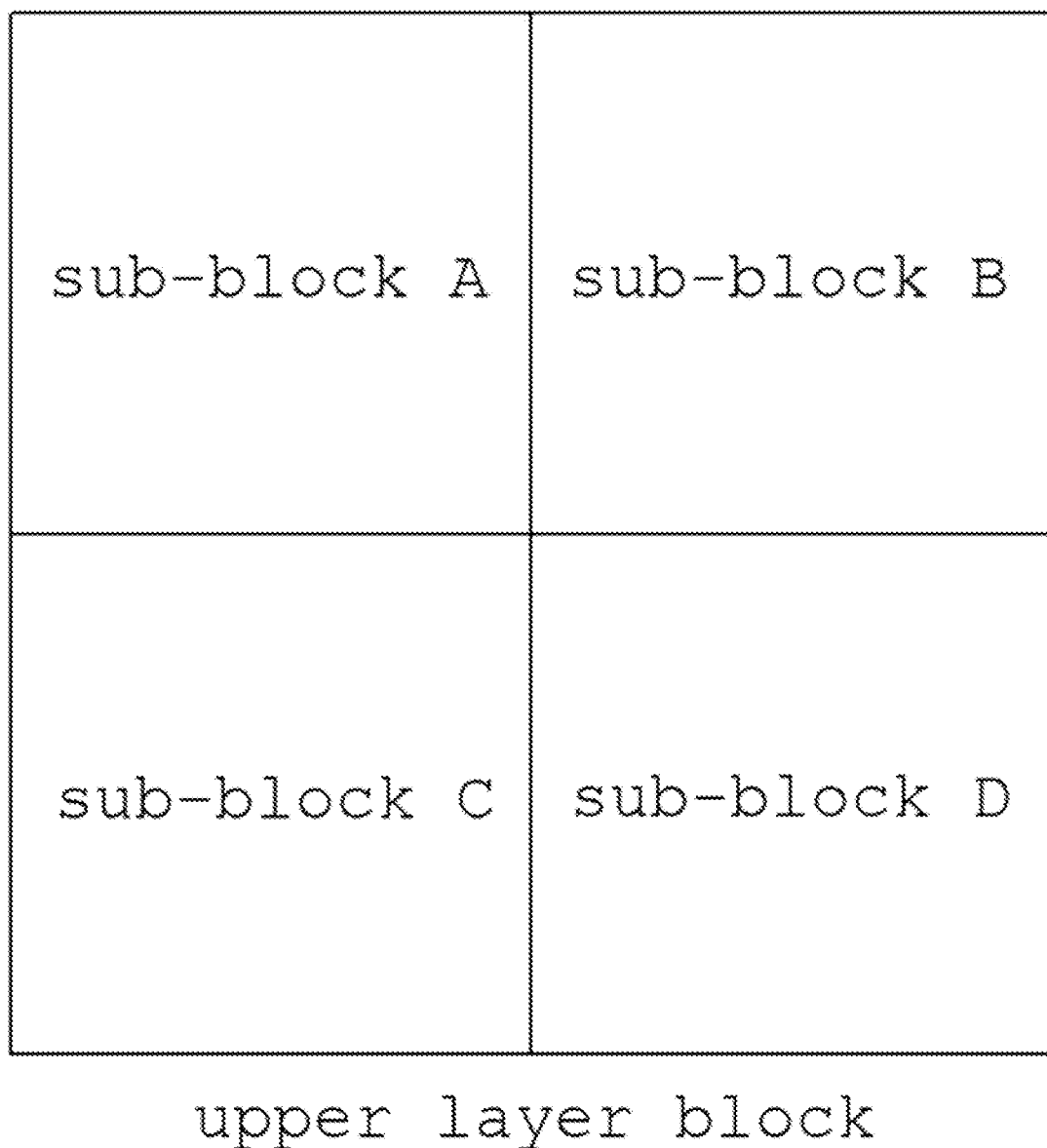
FIG. 25 is a view illustrating another embodiment for constructing a reference candidate list of a current block on the basis of a partition type of a block.

FIG. 25 is a view illustrating another embodiment for constructing a reference candidate list of a current block on the basis of a type of a block partition.

In step S2401, whether the partition type of the upper level block of the current block is a quad tree partition may be determined. That is, in step S2401, whether the current block is a block generated by quad tree partitioning may be determined. When the partition type of the upper level block is not a quad tree partition, it is determined that there is no neighboring block that is excluded in the constructing of the reference candidate list, and the processing of FIG. 24 may be ended. When the partition type of the upper level block is a quad tree partition, that is, when the current block is a block generated by quad tree partitioning, step S2402 may be performed.

In step S2402, whether the current block is the last sub-block in the encoding order among four sub-blocks generated by quad tree partitioning may be determined. The last sub-block may be a sub-block D in the example shown in FIG. 25. When the current block is not the sub-block D, it is determined that there is no neighboring block that is excluded in the constructing of the reference candidate list, and the processing of FIG. 24 may be ended. When the current block is the sub-block D, step S2403 may be performed.

In step S2403, whether the prediction information of sub-blocks A, B, and C in FIG. 25 are all the same may be determined. When the prediction information of the sub-blocks A, B, and C is not all the same, it is determined that there is no neighboring block that is excluded in the constructing of the reference candidate list, and the process of FIG. 24 may be ended. When the prediction information of the sub-block A, B, and C are all the same, in step S2404, when constructing the reference candidate list of the sub-block D that is the current block, the prediction information of the sub-blocks A, B, and C may be excluded from the reference candidate list. When an upper level block is partitioned into four sub-blocks by quad tree partitioning, then at least one sub-block of the four sub-blocks is likely not similar to the remaining sub-blocks. In this case, there is a low likelihood that the prediction information of sub-blocks that are not similar to each other is used as prediction information of the current block. For example, in the example shown in FIG. 25, when the prediction information of the sub-blocks A, B, and C is the same, there is a high likelihood that the prediction information of the sub-block D is not the same as or similar to the prediction information of the sub-blocks A, B, and C. Therefore, even in the case of neighboring blocks of the current block, the sub-blocks A, B, and C are excluded from the candidate group of the sub-block D, whereby prediction efficiency and the compression ratio may be improved.

In step S2405, a candidate for substituting the excluded reference candidate may be searched. The substitute candidate may be determined by various methods. For example, as described above, predetermined prediction information (DC or planar mode for intra prediction mode, zero motion information for inter prediction mode, etc.) may be used. As another example, among the blocks not adjacent to the current block, prediction information of the most recently encoded block preceding the current block may be used. Alternatively, step S2405 may be omitted.

Figure 26:
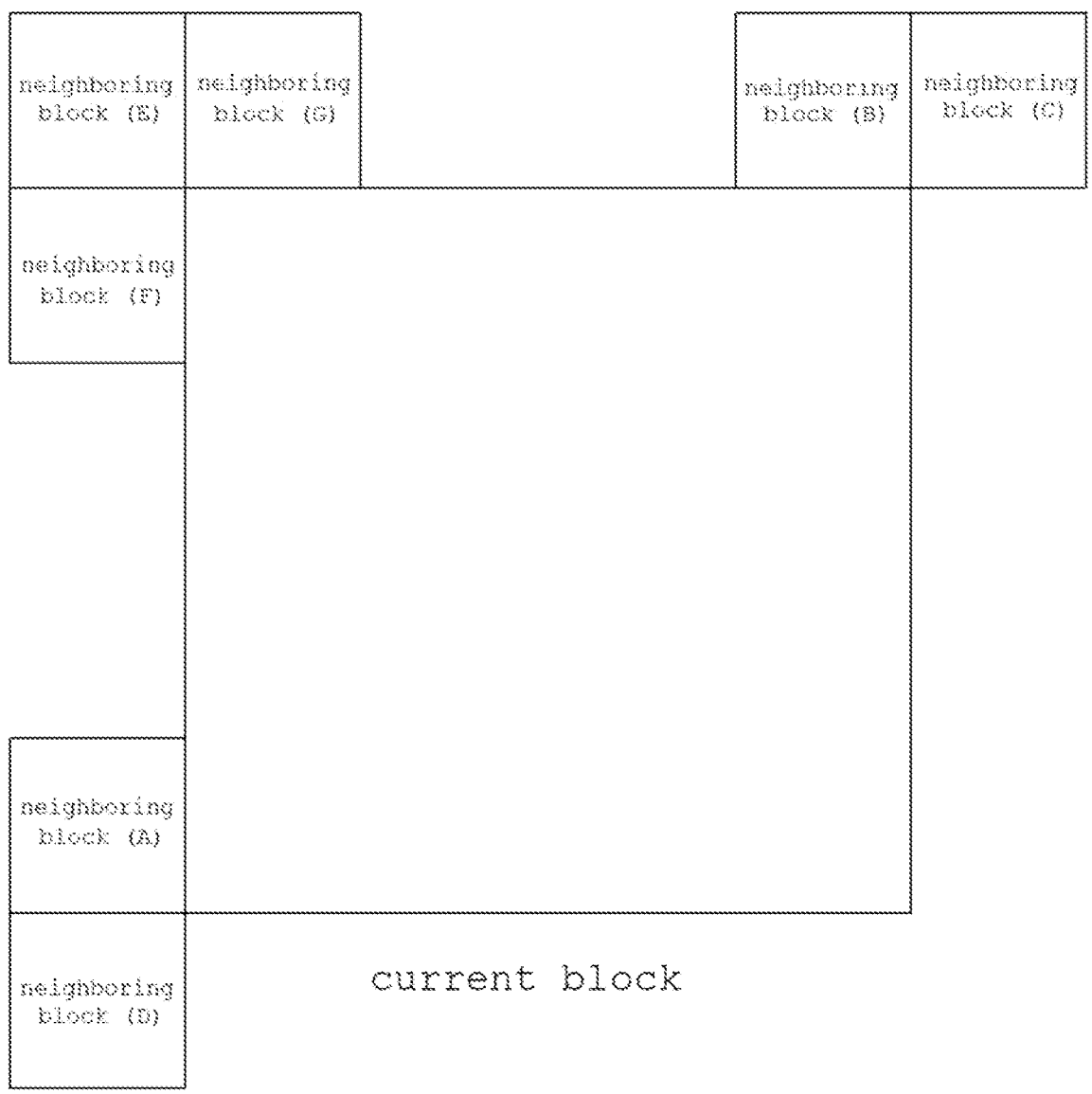
FIG. 26 is a view illustrating a method of changing the priority of neighboring blocks of the current block included in the reference candidate list.

FIG. 26 is a view illustrating a method of changing the priority of neighboring blocks of the current block included in the reference candidate list.

In the embodiment described with reference to FIG. 26, it is possible to adaptively determine the priority of available neighboring blocks of the current block when constructing the reference candidate list of the current block.

According to the first method of the present invention, priorities may be determined on the basis of whether the current block is adjacent to the neighboring block and/or the position of the neighboring block. For example, a higher priority may be given to a neighboring block that is adjacent to the current block, and a lower priority may be given to a neighboring block that is not adjacent to the current block. In the example shown in FIG. 26, the neighboring blocks A, B, F, and G are blocks adjacent to the current block. Therefore, the neighboring blocks A, B, F, and G may be given a high priority. Also, the priority among adjacent neighboring blocks may be determined according to a predetermined method. For example, a block at a particular position may be given a high priority. The particular location may be, for example, the left and/or top of the current block. According to such criterion, the priority of the neighboring blocks shown in FIG. 26 may be determined in the order of blocks A→B→F→G→C→D→E. Conversely, a low priority may be given to a block adjacent to the current block, and a high priority may be given to a block not adjacent to the current block. In this case, the priority may be determined in the order of blocks C→D→E→A→B→F→G.

According to the second method of the present invention, the priority may be changed on the basis of the block partition depth information of the current block and the neighboring block. For example, priority may be given on the basis of the degree of similarity between the partition depth of the current block and the partition depth of the neighboring block. For example, a neighboring block having a partition depth similar to that of the current block may be given a higher priority. The priority may be given to neighboring blocks of the same partition depth on an arbitrary basis. For example, a neighboring block at a specific location, such as the left or top of a current block, may be given a high priority.

Figure 27:
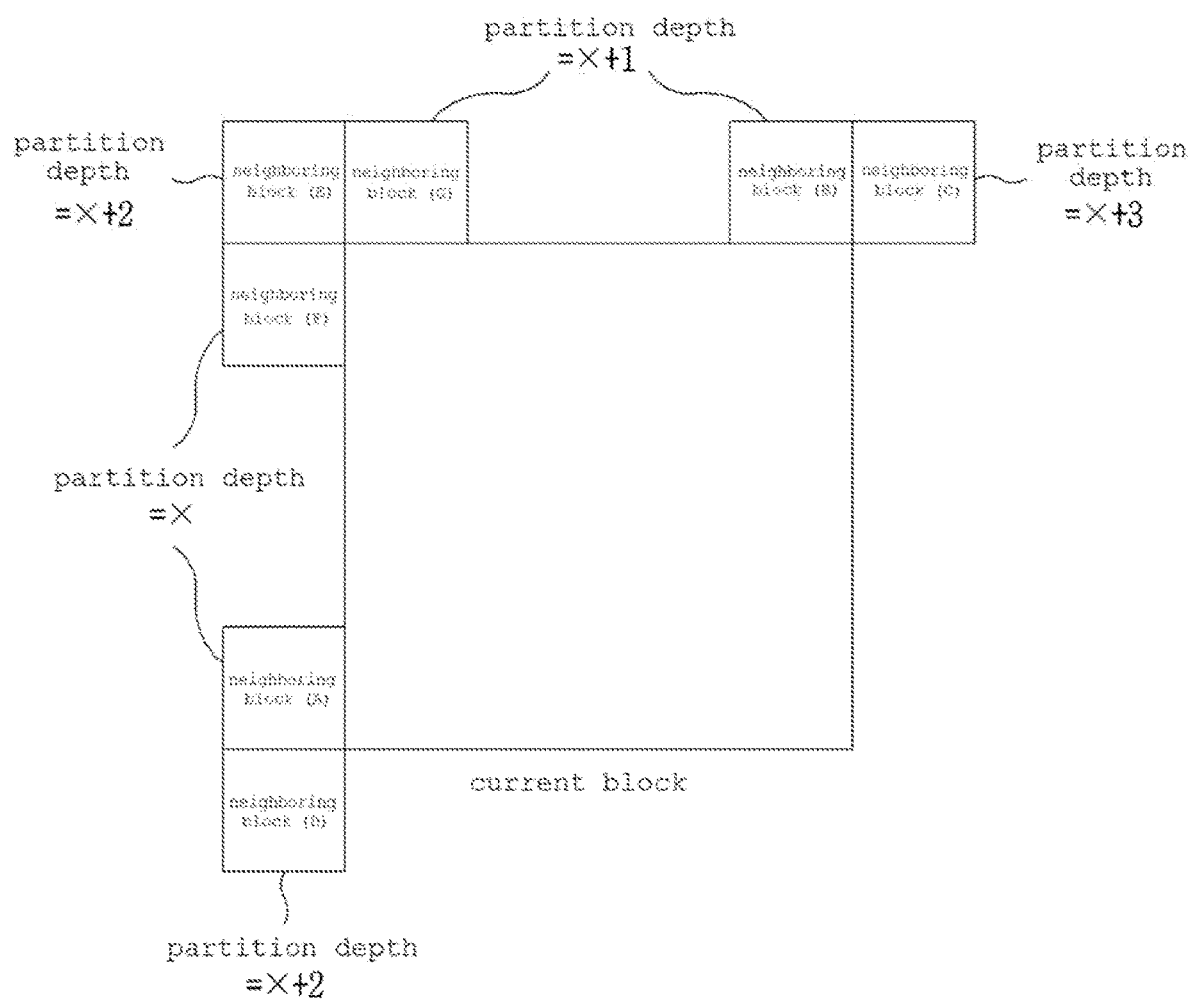
FIG. 27 is a view illustrating a method of determining priority of neighboring blocks on the basis of the partition depth.

FIG. 27 is a view illustrating a method of determining a priority of neighboring blocks on the basis of the partition depth.

In an example shown in FIG. 27, the partition depth of the current block is X, the partition depth of the neighboring blocks A and F is X, the partition depth of neighboring blocks B and G is X+1, the partition depth of neighboring blocks D and E is X+2, and the partition depth of neighboring block C is X+3. According to the second method according to the present invention, a neighboring block having a partition depth similar to the partition depth of the current block is given a high priority in consideration of the partition depth of the current block, so that the priority may be determined in the order of blocks A→F→G→B→D→E→C. Alternatively, without considering the partition depth of the current block, the higher the partition depth of the neighboring blocks, the higher the priority may be given. For example, the priority of neighboring blocks considering only the partition depth of neighboring blocks may be determined in the order of blocks C→D→E→A→F→G→B. Alternatively, a lower priority may be given to a neighboring block having the partition depth similar to that of the current block, or the lower the partition depth of the neighboring blocks, the higher the priority may be given.

Figure 28:
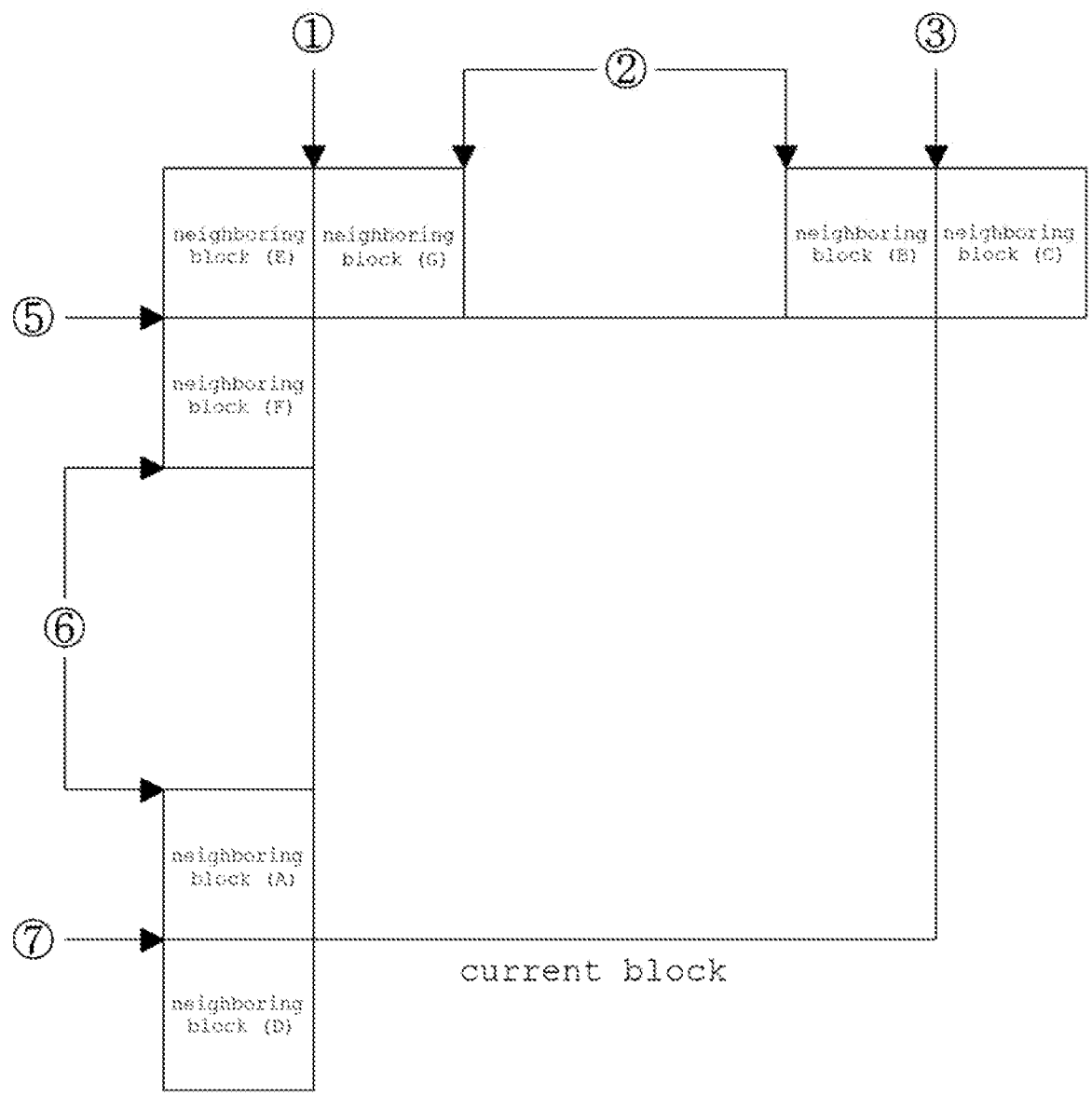
FIG. 28 is a view illustrating a method of determining priority of neighboring blocks on the basis of a partitioning order.

According to the third method of the present invention, the priority of neighboring blocks may be determined on the basis of the partition order of the blocks. For example, a neighboring block that is most recently partitioned and encoded/decoded on the basis of the current block may be given a high priority. FIG. 28 is a view illustrating a method of prioritizing neighboring blocks on the basis of a partition order. In the example shown in FIG. 28, the partition order of neighboring blocks is indicated at the boundaries between blocks. According to the example shown in FIG. 28, the priority of neighboring blocks considering the partition order of neighboring blocks may be determined in order of blocks E→B→C→F→A→D. Alternatively, a low priority may be given to a neighboring block that has been most recently partitioned and encoded/decoded on the basis of the current block.

According to the fourth method of the present invention, the priority of the neighboring blocks may be determined on the basis of the causal relationship of the prediction information between neighboring blocks. For example, when the first neighboring block of the current block is encoded/decoded using prediction information of another second neighboring block, the first neighboring block may be given a low priority. FIG. 29 is a view illustrating a method of determining the priority of neighboring blocks on the basis of casual relationship of prediction information. In FIG. 29, (a) shows the location of current block and neighboring blocks. In FIG. 29, (b) shows prediction information of each neighboring block. According to the example shown in FIG. 29, the prediction information is determined with reference to the prediction information of the block G in the block B. Similarly, prediction information is determined by referring to the prediction information of the block B, the prediction information of the block A, and the prediction information of the block G and the block E in the block C and the block B, respectively. That is, for example, since the prediction information of the block B is determined on the basis the prediction information of the block G, it may be said that there is a causal relationship between the prediction information of the block G and the prediction information of the block B. In the example shown in (a) of FIG. 29, the priority of the neighboring blocks may be in any order, for example, in an order of blocks A→B→C→D→E→F→G. The priority may be changed in consideration of the causal relationship between the predicted information. For example, since the blocks B, C, D, and G are encoded/decoded referring to prediction information of other neighboring blocks, low priority may be given thereto. Finally, the priorities of the neighboring blocks considering the causality between the predictions of the neighboring blocks may be determined in order of blocks A→E→F→B→C→D→G. Alternatively, when the first neighboring block refers to the prediction information of the second neighboring block, the second neighboring block may be given a lower priority.

Figure 30:
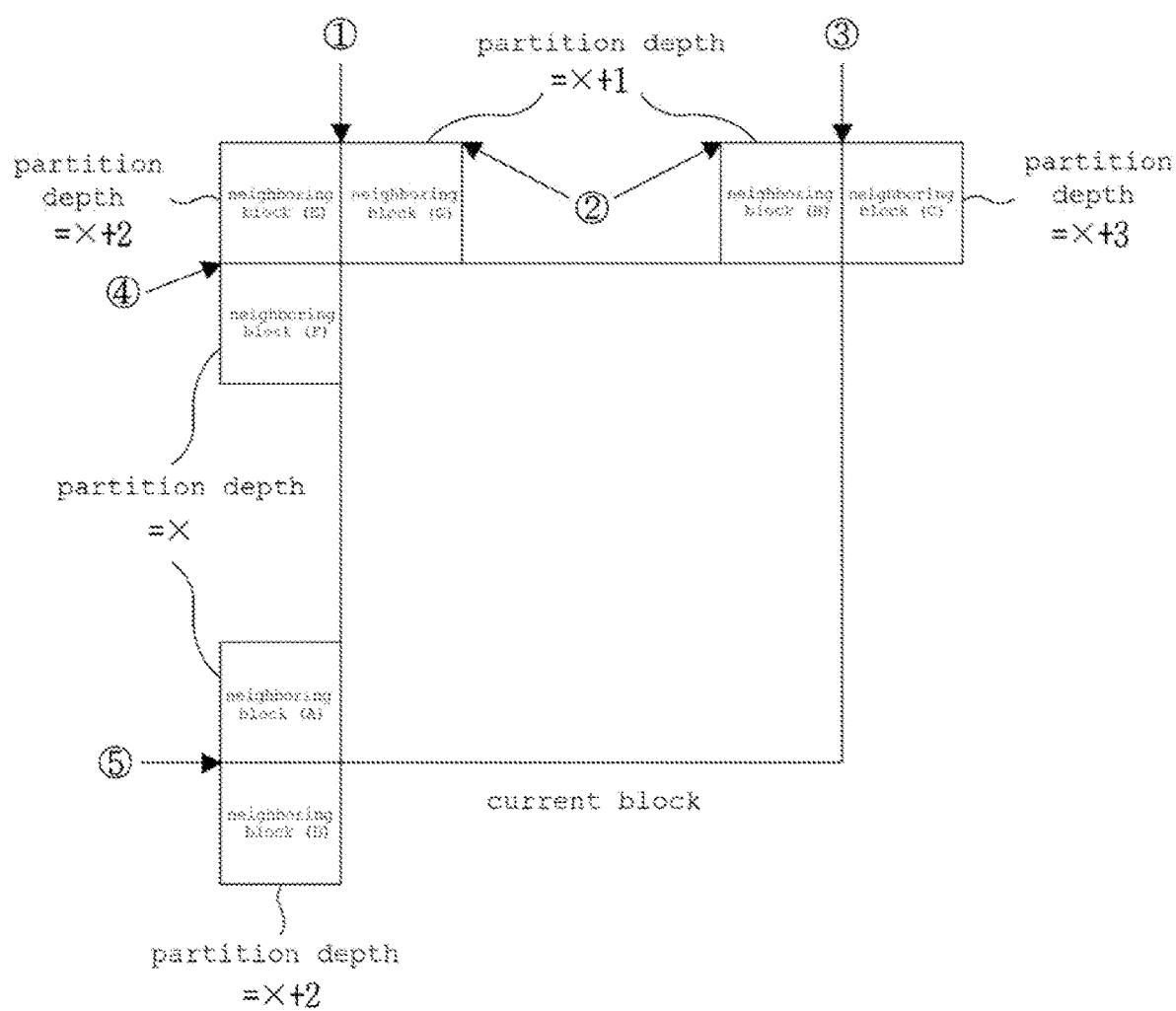
FIG. 30 is a view illustrating a method of determining the priority of neighboring blocks considering both the partition depth and the partitioning order.

In the above, four methods for determining the priority of the neighboring blocks when constructing the reference candidate list using the neighboring blocks of the current block have been described. The first to fourth methods may be applied independently. Alternatively at least two or more of the first to fourth methods may be applied in combination. For example, by applying the second method and the third method simultaneously, the priority of the neighboring blocks for the configuring of the reference candidate list may be determined. FIG. 30 is a view illustrating a method of determining the priority of neighboring blocks considering both partition depth and partition order. FIG. 30 shows the partition depths (X, X+1, X+2, X+3) and partition orders (1 to 5) of neighboring blocks. There are various methods in which the second method and the third method are simultaneously applied. For example, a neighboring block with a partition depth similar to that of the current block may be given a high priority, and a neighboring block with a fast partition order may be given a high priority. In this case, it is possible to first arrange the priority on the basis of the partition order. In the example shown in FIG. 30, on the basis of the partition order, it may be first arranged in the order of blocks E→G→B→C→F→A→D. Thereafter, a neighboring block with a partition depth similar to the partition depth of the current block may be given a higher priority. For example, since the partition depth (X+1) of the block G is more similar to the partition depth (X) of the current block than the partition depth (X+2) of the block E, the priority is arranged in the order of G→E→B→C→F→A→D. Since the partition depth (X) of the blocks A and F is more similar to the partition depth (X) of the current block than the partition depth (X+3) of the block C, the priority is arranged in the order of E→G→B→F→A→C→D. The priority of the neighboring block for the reference candidate list of the current block may be determined by applying two or more criteria as described above.

Although the exemplary methods of this disclosure are represented by a series of acts for clarity of explanation, they are not intended to limit the order in which the steps are performed, and if necessary, each step may be performed simultaneously or in a different order. In order to implement the method according to the present disclosure, the illustrative steps may additionally include other steps, include the remaining steps except for some steps, or may include additional steps other than some steps.

The various embodiments of the present disclosure are not intended to be all-inclusive and are intended to be illustrative of the typical aspects of the present disclosure, and those described in the various embodiments may be applied independently or in a combination of two or more.

Furthermore, various embodiments of the present disclosure may be implemented by hardware, firmware, software, or a combination thereof. The hardware may be implemented by one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like.

The scope of the present disclosure includes software or machine-executable instructions (e.g., operating system, applications, firmware, programs, etc.) that cause operations in accordance with methods of the various embodiments to be performed on a device or computer, and non-transitory computer-readable medium executable on the device or computer in which such software or instructions is stored.

INDUSTRIAL APPLICABILITY

The present invention may be used to encode/decode an image.

The invention claimed is:
1. A video decoding method comprising:
  determining a partition type of an upper block including a current block;
  deriving a reference candidate list for the current block based on the partition type of the upper block;
  deriving prediction information of the current block based on the reference candidate list;
  generating a prediction block of the current block based on the prediction information; and
  reconstructing the current block based on the prediction block and a residual block of the current block,
  wherein the reference candidate list includes at least one candidate block, and wherein, when the upper block includes a neighboring block adjacent to the current block, the reference candidate list for the current block includes a candidate block adjacent to the neighboring block but not to the current block.

2. The video decoding method of claim 1,
the residual block being generated by performing inverse transform on a transform block of the current block.

3. A video encoding method comprising:
determining a partition type of an upper block including a current block;
deriving a reference candidate list for the current block based on the partition type of the upper block;
generating a prediction block of the current block based on the reference candidate list;
encoding prediction information of the current block based on the prediction block; and
reconstructing the current block based on the prediction block and a residual block of the current block,
wherein the reference candidate list includes at least one candidate block, and
wherein, when the upper block includes a neighboring block adjacent to the current block, the reference candidate list for the current block includes a candidate block adjacent to the neighboring block but not to the current block.

4. A non-transitory computer-readable recording medium storing a bitstream generated by a video encoding method with a video encoding apparatus, the video encoding method comprises:
determining a partition type of an upper block including a current block;
deriving a reference candidate list for the current block based on the partition type of the upper block;
generating a prediction block of the current block based on the reference candidate list;
reconstructing the current block based on the prediction block and a residual block of the current block; and
encoding prediction information of the current block based on the prediction block into a bitstream,
wherein the reference candidate list includes at least one candidate block, and
wherein, when the upper block includes a neighboring block adjacent to the current block, the reference candidate list for the current block includes a candidate block adjacent to the neighboring block but not to the current block.

* * * * *